US008118662B2

(12) United States Patent
Caputo et al.

(10) Patent No.: US 8,118,662 B2
(45) Date of Patent: Feb. 21, 2012

(54) GAMING SYSTEM, GAMING DEVICE AND METHOD FOR PROVIDING PLAYER SELECTION OF MODIFIERS TO GAME COMPONENTS

(75) Inventors: Scott A. Caputo, Santa Clara, CA (US); Ryan William Cuddy, Reno, NV (US); Rogelio S. Decasa, Sparks, NV (US); Benjamin Mikal Fuller, Mexico City (MX); Carl Victor Kniesteadt, Reno, NV (US); Alan Robert Weiss, Petaluma, CA (US)

(73) Assignee: IGT, Reno, NV (US)

(*) Notice: Subject to any disclaimer, the term of this patent is extended or adjusted under 35 U.S.C. 154(b) by 402 days.

(21) Appl. No.: 12/423,596

(22) Filed: Apr. 14, 2009

(65) Prior Publication Data

US 2009/0253492 A1 Oct. 8, 2009

Related U.S. Application Data

(63) Continuation-in-part of application No. 11/877,508, filed on Oct. 23, 2007.

(51) Int. Cl.

*A63F 9/24* (2006.01)
*A63F 13/00* (2006.01)
*G06F 19/00* (2006.01)

(52) U.S. Cl. ........................................ 463/20; 463/26

(58) Field of Classification Search .................... 463/20, 463/26

See application file for complete search history.

(56) References Cited

U.S. PATENT DOCUMENTS

| | | | |
|---|---|---|---|
| 3,618,952 | A | 11/1971 | Tallarida |
| 4,618,150 | A | 10/1986 | Kimura |
| 4,624,459 | A | 11/1986 | Kaufman |
| 4,695,053 | A | 9/1987 | Vazquez, Jr. et al. |
| 4,760,527 | A | 7/1988 | Sidley |
| 4,856,787 | A | 8/1989 | Itkis |
| 4,926,327 | A | 5/1990 | Sidley |
| 5,046,737 | A | 9/1991 | Fienberg |
| 5,205,555 | A | 4/1993 | Hamano |
| 5,294,120 | A | 3/1994 | Schultz |
| 5,342,047 | A | 8/1994 | Heidel et al. |
| 5,393,057 | A | 2/1995 | Marnell, II |
| 5,449,173 | A | 9/1995 | Thomas et al. |
| 5,511,781 | A | 4/1996 | Wood et al. |
| 5,536,016 | A | 7/1996 | Thompson |
| 5,564,700 | A | 10/1996 | Celona |
| 5,655,961 | A | 8/1997 | Acres et al. |
| 5,664,998 | A | 9/1997 | Seelig et al. |
| 5,741,183 | A | 4/1998 | Acres et al. |

(Continued)

FOREIGN PATENT DOCUMENTS

EP 874337 A1 10/1998

(Continued)

*Primary Examiner* — William D Coleman
(74) *Attorney, Agent, or Firm* — K&L Gates LLP

(57) ABSTRACT

In one embodiment, the gaming system and method disclosed herein provides a plurality of gaming devices that each participate in a group game including a plurality of masked group game components and determines and provides separate awards to each player of the gaming devices based on the amount of modifiers applied to each of the group game components having a modifier applied by the player of that gaming device. In one embodiment, the gaming system enables each player to selectively apply or associate a plurality of modifiers to a single game component or apply the plurality of modifiers across the plurality of game components. For each gaming device, the gaming system displays and provides any awards to the player of that gaming device.

23 Claims, 19 Drawing Sheets

U.S. PATENT DOCUMENTS

| | | | |
|---|---|---|---|
| 5,752,882 | A | 5/1998 | Acres et al. |
| 5,762,552 | A | 6/1998 | Vuong et al. |
| 5,769,716 | A | 6/1998 | Saffari et al. |
| 5,772,509 | A | 6/1998 | Weiss |
| 5,820,459 | A | 10/1998 | Acres et al. |
| 5,823,873 | A | 10/1998 | Moody |
| 5,823,874 | A | 10/1998 | Adams |
| 5,833,537 | A | 11/1998 | Barrie |
| 5,833,538 | A | 11/1998 | Weiss |
| 5,836,817 | A | 11/1998 | Acres et al. |
| 5,848,932 | A | 12/1998 | Adams |
| 5,851,148 | A | 12/1998 | Brune et al. |
| 5,873,781 | A | 2/1999 | Keane |
| 5,876,284 | A | 3/1999 | Acres et al. |
| 5,882,261 | A | 3/1999 | Adams |
| 5,927,714 | A | 7/1999 | Kaplan |
| 5,938,200 | A | 8/1999 | Markowicz et al. |
| 5,947,820 | A | 9/1999 | Morro et al. |
| 5,951,397 | A | 9/1999 | Dickinson |
| 5,967,894 | A | 10/1999 | Kinoshita et al. |
| 5,976,016 | A | 11/1999 | Moody et al. |
| 5,980,384 | A | 11/1999 | Barrie |
| 5,984,781 | A | 11/1999 | Sunaga |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,033,307 | A | 3/2000 | Vancura |
| 6,056,642 | A | 5/2000 | Bennett |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,102,798 | A | 8/2000 | Bennett |
| 6,120,031 | A | 9/2000 | Adams |
| 6,120,377 | A | 9/2000 | McGinnis, Sr. et al. |
| 6,120,378 | A | 9/2000 | Moody et al. |
| 6,126,542 | A | 10/2000 | Fier |
| 6,135,884 | A | 10/2000 | Hedrick et al. |
| 6,142,872 | A | 11/2000 | Walker et al. |
| 6,142,874 | A | 11/2000 | Kodachi et al. |
| 6,155,925 | A | 12/2000 | Giobbi et al. |
| 6,159,097 | A | 12/2000 | Gura |
| 6,159,098 | A | 12/2000 | Slomiany et al. |
| 6,162,122 | A | 12/2000 | Acres et al. |
| 6,164,652 | A | 12/2000 | Lauretta et al. |
| 6,168,523 | B1 | 1/2001 | Piechowiak et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,430 | B1 | 3/2001 | Walker et al. |
| 6,206,782 | B1 | 3/2001 | Walker et al. |
| 6,210,275 | B1 | 4/2001 | Olsen |
| 6,231,442 | B1 | 5/2001 | Mayeroff |
| 6,231,445 | B1 | 5/2001 | Acres |
| 6,234,897 | B1 | 5/2001 | Frohm et al. |
| 6,244,958 | B1 | 6/2001 | Acres |
| 6,254,483 | B1 | 7/2001 | Acres |
| 6,257,981 | B1 | 7/2001 | Acres et al. |
| 6,261,177 | B1 | 7/2001 | Bennett |
| 6,299,165 | B1 | 10/2001 | Nagano |
| 6,302,790 | B1 | 10/2001 | Brossard |
| 6,309,300 | B1 | 10/2001 | Glavich |
| 6,311,976 | B1 | 11/2001 | Yoseloff et al. |
| 6,312,332 | B1 | 11/2001 | Walker et al. |
| 6,312,333 | B1 | 11/2001 | Acres |
| 6,312,334 | B1 | 11/2001 | Yoseloff |
| 6,315,664 | B1 | 11/2001 | Baerlocher et al. |
| 6,319,124 | B1 | 11/2001 | Baerlocher et al. |
| 6,319,125 | B1 | 11/2001 | Acres |
| 6,328,649 | B1 | 12/2001 | Randall et al. |
| 6,336,860 | B1 | 1/2002 | Webb |
| 6,346,043 | B1 | 2/2002 | Colin et al. |
| 6,361,441 | B1 | 3/2002 | Walker et al. |
| 6,364,765 | B1 | 4/2002 | Walker et al. |
| 6,364,767 | B1 | 4/2002 | Brossard et al. |
| 6,364,768 | B1 | 4/2002 | Acres et al. |
| 6,371,852 | B1 | 4/2002 | Acres |
| 6,375,567 | B1 | 4/2002 | Acres |
| 6,375,569 | B1 | 4/2002 | Acres |
| 6,386,975 | B1 | 5/2002 | Peterson |
| 6,394,902 | B1 | 5/2002 | Glavich et al. |
| 6,398,218 | B1 | 6/2002 | Vancura |
| 6,398,643 | B1 | 6/2002 | Knowles et al. |
| 6,398,645 | B1 | 6/2002 | Yoseloff |
| 6,413,161 | B1 | 7/2002 | Baerlocher et al. |
| 6,416,408 | B2 | 7/2002 | Tracy et al. |
| 6,431,983 | B2 | 8/2002 | Acres |
| 6,439,995 | B1 | 8/2002 | Hughs-Baird et al. |
| 6,443,452 | B1 | 9/2002 | Brune |
| 6,450,883 | B1 | 9/2002 | O'Halloran |
| RE37,885 | E | 10/2002 | Acres et al. |
| 6,461,241 | B1 | 10/2002 | Webb et al. |
| 6,503,146 | B2 | 1/2003 | Walker et al. |
| 6,511,375 | B1 | 1/2003 | Kaminkow |
| 6,514,141 | B1 | 2/2003 | Kaminkow et al. |
| 6,554,703 | B1 | 4/2003 | Bussick et al. |
| 6,558,254 | B2 | 5/2003 | Baelocher et al. |
| 6,561,904 | B2 | 5/2003 | Locke et al. |
| 6,565,434 | B1 | 5/2003 | Acres |
| 6,569,015 | B1 | 5/2003 | Baerlocher et al. |
| 6,575,830 | B2 | 6/2003 | Baerlocher et al. |
| 6,582,307 | B2 | 6/2003 | Webb |
| 6,595,854 | B2 | 7/2003 | Hughs-Baird et al. |
| 6,599,185 | B1 | 7/2003 | Kaminkow et al. |
| 6,602,137 | B2 | 8/2003 | Kaminkow et al. |
| 6,607,441 | B1 | 8/2003 | Acres |
| 6,638,164 | B2 | 10/2003 | Randall et al. |
| 6,641,477 | B1 | 11/2003 | Dietz, II |
| 6,676,516 | B2 | 1/2004 | Baerlocher et al. |
| 6,692,353 | B2 | 2/2004 | Walker et al. |
| 6,692,355 | B2 | 2/2004 | Baerlocher et al. |
| 6,692,356 | B2 | 2/2004 | Baerlocher et al. |
| 6,712,697 | B2 | 3/2004 | Acres |
| 6,712,699 | B2 | 3/2004 | Walker et al. |
| 6,722,981 | B2 | 4/2004 | Kaminkow et al. |
| 6,722,982 | B2 | 4/2004 | Kaminkow et al. |
| 6,726,525 | B1 | 4/2004 | Kato et al. |
| 6,726,565 | B2 | 4/2004 | Hughs-Baird |
| 6,733,386 | B2 | 5/2004 | Cuddy et al. |
| 6,733,390 | B2 | 5/2004 | Walker et al. |
| 6,749,504 | B2 | 6/2004 | Hughs-Baird |
| 6,769,983 | B2 | 8/2004 | Slomiany |
| 6,780,107 | B2 | 8/2004 | Baerlocher et al. |
| 6,783,457 | B2 | 8/2004 | Hughs-Baird et al. |
| 6,800,030 | B2 | 10/2004 | Acres |
| 6,817,944 | B2 | 11/2004 | Kaminkow et al. |
| 6,832,958 | B2 | 12/2004 | Acres et al. |
| 6,843,722 | B2 | 1/2005 | Webb |
| 6,875,108 | B1 | 4/2005 | Hughs-Baird |
| 6,899,620 | B2 | 5/2005 | Kaminkow et al. |
| 6,910,964 | B2 | 6/2005 | Acres |
| 6,910,965 | B2 | 6/2005 | Downes |
| 6,913,532 | B2 | 7/2005 | Baerlocher et al. |
| 6,932,701 | B2 | 8/2005 | Glavich et al. |
| 6,939,224 | B2 | 9/2005 | Palmer et al. |
| RE38,812 | E | 10/2005 | Acres et al. |
| 6,955,600 | B2 | 10/2005 | Glavich et al. |
| 6,958,013 | B2 | 10/2005 | Miereau et al. |
| 6,966,833 | B2 | 11/2005 | Kaminkow et al. |
| 6,971,954 | B2 | 12/2005 | Randall et al. |
| 6,971,955 | B2 | 12/2005 | Baerlocher et al. |
| 6,979,263 | B2 | 12/2005 | Baerlocher et al. |
| 7,029,395 | B1 | 4/2006 | Baerlocher |
| 7,037,191 | B2 | 5/2006 | Rodgers et al. |
| 7,040,984 | B2 | 5/2006 | Mead |
| 7,056,214 | B2 | 6/2006 | Miereau et al. |
| 7,066,466 | B1 | 6/2006 | Stavinsky et al. |
| 7,066,814 | B2 | 6/2006 | Glavich et al. |
| 7,094,148 | B2 | 8/2006 | Baerlocher et al. |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,160,186 | B2 | 1/2007 | Cuddy et al. |
| 7,160,188 | B2 | 1/2007 | Kaminkow et al. |

| | | | |
|---|---|---|---|
| 7,172,506 | B2 | 2/2007 | Baerlocher et al. |
| 7,182,689 | B2 | 2/2007 | Glavich et al. |
| 7,192,352 | B2 | 3/2007 | Walker et al. |
| 7,235,011 | B2 | 6/2007 | Randall et al. |
| 7,238,110 | B2 | 7/2007 | Glavich et al. |
| 7,247,092 | B2 | 7/2007 | Jarvis et al. |
| 7,250,001 | B2 | 7/2007 | Baerlocher et al. |
| 7,258,611 | B2 | 8/2007 | Bigelow, Jr. et al. |
| 7,264,545 | B2 | 9/2007 | Maya et al. |
| 7,273,415 | B2 | 9/2007 | Cregan et al. |
| 7,300,348 | B2 | 11/2007 | Kaminkow et al. |
| 7,303,469 | B2 | 12/2007 | Kaminkow |
| 7,306,518 | B2 | 12/2007 | Hughs-Baird et al. |
| 7,311,598 | B2 | 12/2007 | Kaminkow et al. |
| 7,311,604 | B2 | 12/2007 | Kaminkow et al. |
| 7,314,409 | B2 | 1/2008 | Maya et al. |
| 7,322,887 | B2 | 1/2008 | Belger et al. |
| 7,331,863 | B2 | 2/2008 | Baerlocher |
| 7,338,370 | B2 | 3/2008 | Oles et al. |
| 7,351,140 | B2 | 4/2008 | Wolf et al. |
| 7,354,344 | B2 | 4/2008 | Paulsen et al. |
| 7,364,510 | B2 | 4/2008 | Walker et al. |
| 7,371,174 | B2 | 5/2008 | Baerlocher |
| 7,377,849 | B2 | 5/2008 | Baerlocher et al. |
| 7,381,134 | B2 | 6/2008 | Cuddy et al. |
| 7,393,280 | B2 | 7/2008 | Cannon |
| 7,413,510 | B2 | 8/2008 | Schlegel et al. |
| 7,427,236 | B2 | 9/2008 | Kaminkow et al. |
| 7,435,174 | B2 | 10/2008 | Baerlocher et al. |
| 7,448,949 | B2 | 11/2008 | Kaminkow et al. |
| 2001/0055990 | A1 | 12/2001 | Acres |
| 2002/0052232 | A1 | 5/2002 | Kaminkow |
| 2003/0036422 | A1 | 2/2003 | Baerlocher et al. |
| 2003/0036424 | A1 | 2/2003 | Baerlocher |
| 2003/0040358 | A1 | 2/2003 | Rothkranz et al. |
| 2003/0060266 | A1 | 3/2003 | Baerlocher |
| 2003/0064773 | A1 | 4/2003 | Baerlocher et al. |
| 2003/0125107 | A1 | 7/2003 | Cannon |
| 2003/0162584 | A1 | 8/2003 | Hughs-Baird et al. |
| 2003/0181233 | A1 | 9/2003 | Baerlocher et al. |
| 2003/0190945 | A1 | 10/2003 | Bussick et al. |
| 2003/0228904 | A1 | 12/2003 | Acres et al. |
| 2004/0038724 | A1 | 2/2004 | Asdale |
| 2004/0048649 | A1 | 3/2004 | Peterson et al. |
| 2004/0053665 | A1 | 3/2004 | Baerlocher |
| 2004/0082378 | A1 | 4/2004 | Peterson et al. |
| 2004/0195773 | A1 | 10/2004 | Masci et al. |
| 2004/0242316 | A1 | 12/2004 | Oles et al. |
| 2005/0032573 | A1 | 2/2005 | Acres et al. |
| 2005/0033461 | A1 | 2/2005 | Gerrard et al. |
| 2005/0054404 | A1 | 3/2005 | Baerlocher |
| 2005/0054405 | A1 | 3/2005 | Baerlocher et al. |
| 2005/0054415 | A1 | 3/2005 | Kaminkow et al. |
| 2005/0054416 | A1 | 3/2005 | Hostetler et al. |
| 2005/0054435 | A1 | 3/2005 | Rodgers et al. |
| 2005/0059456 | A1 | 3/2005 | Mead et al. |
| 2005/0059461 | A1 | 3/2005 | Ching et al. |
| 2005/0075163 | A1 | 4/2005 | Cuddy et al. |
| 2005/0096123 | A1 | 5/2005 | Cregan et al. |
| 2005/0101372 | A1 | 5/2005 | Mierau et al. |
| 2005/0101374 | A1 | 5/2005 | Acres |
| 2005/0170876 | A1 | 8/2005 | Masci et al. |
| 2005/0192081 | A1 | 9/2005 | Marks et al. |
| 2006/0025195 | A1 | 2/2006 | Pennington et al. |
| 2006/0025196 | A1 | 2/2006 | Webb et al. |
| 2006/0030401 | A1 | 2/2006 | Mead et al. |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0063582 | A1 | 3/2006 | Baerlocher et al. |
| 2006/0063585 | A1 | 3/2006 | Cuddy |
| 2006/0068882 | A1 | 3/2006 | Baerlocher et al. |
| 2006/0068884 | A1 | 3/2006 | Baerlocher et al. |
| 2006/0068885 | A1 | 3/2006 | Cregan et al. |
| 2006/0073874 | A1 | 4/2006 | Cregan et al. |
| 2006/0073876 | A1 | 4/2006 | Cuddy |
| 2006/0084486 | A1 | 4/2006 | Belger et al. |
| 2006/0084494 | A1 | 4/2006 | Belger et al. |
| 2006/0111164 | A1 | 5/2006 | Hornik et al. |
| 2006/0246977 | A1 | 11/2006 | Cannon |
| 2007/0032285 | A1 | 2/2007 | Wolf |
| 2007/0049372 | A1 | 3/2007 | Olivas et al. |
| 2007/0054732 | A1 | 3/2007 | Baerlocher |
| 2007/0054733 | A1 | 3/2007 | Baerlocher |
| 2007/0060271 | A1 | 3/2007 | Cregan et al. |
| 2007/0077990 | A1 | 4/2007 | Cuddy et al. |
| 2007/0105619 | A1 | 5/2007 | Kniesteadt et al. |
| 2007/0105620 | A1 | 5/2007 | Cuddy et al. |
| 2008/0182638 | A1 | 7/2008 | Paulsen et al. |
| 2008/0274790 | A1 | 11/2008 | Cannon |

FOREIGN PATENT DOCUMENTS

| | | | |
|---|---|---|---|
| EP | 945837 | A2 | 9/1999 |
| EP | 984409 | A2 | 3/2000 |
| GB | 2086631 | A | 5/1982 |
| GB | 2183882 | A | 6/1987 |
| GB | 2222712 | A | 3/1990 |
| GB | 2356280 | A | 5/2001 |
| WO | WO 00/32286 | | 6/2000 |
| WO | WO 01/052956 | | 7/2001 |

FIG. 6

| Free Spin | Free Spin Award Amount | Modified Free Spin Award Amount |
|---|---|---|
| 1 | $1.00 | $4.00 |
| 2 | $0.00 | $0.00 |
| 3 | $2.00 | $8.00 |
| 4 | $0.00 | $0.00 |
| 5 | $0.00 | $0.00 |
| 6 | $0.00 | $0.00 |
| 7 | $0.00 | $0.00 |
| 8 | $0.00 | $0.00 |
| 9 | $4.00 | $16.00 |
| 10 | $1.00 | $4.00 |
| 11 | $0.00 | $0.00 |
| 12 | $1.00 | $4.00 |
| Total Free Spin Award | | $36.00 |

FIG. 10B

| Free Spin | Free Spin Award Amount | Player R Modified Free Spin Award Amount (2X Multiplier) | Player S Free Spin Award Amount (1X Multiplier) | Player T Free Spin Award Amount (1X Multiplier) |
|---|---|---|---|---|
| 1 | $2.00 | $4.00 | $2.00 | $2.00 |
| 2 | $0.00 | $0.00 | $0.00 | $0.00 |
| 3 | $4.00 | $8.00 | $4.00 | $4.00 |
| 4 | $0.00 | $0.00 | $0.00 | $0.00 |
| 5 | $0.00 | $0.00 | $0.00 | $0.00 |
| 6 | $0.00 | — | $0.00 | — |
| 7 | $8.00 | — | $8.00 | — |
| 8 | $1.00 | — | $1.00 | — |
| 9 | $0.00 | — | $0.00 | — |
| 10 | $3.00 | — | $3.00 | — |
| Total Free Spin Award | | $12.00 | $18.00 | $6.00 |

GAMING SYSTEM, GAMING DEVICE AND METHOD FOR PROVIDING PLAYER SELECTION OF MODIFIERS TO GAME COMPONENTS

PRIORITY CLAIM

This application is a continuation-in-part of, claims priority to and the benefit of U.S. patent application Ser. No. 11/877,508, filed on Oct. 23, 2007, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for others wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

One such secondary or bonus game for slot games provides a player one or more free spins. In these gaming devices, upon an occurrence of a triggering event in the primary game, the gaming device provides a free spin mode or sequence wherein one or more free spins of the reels are provided to the player. The player plays the free spin mode or sequence, likely receives one or more awards during one or more of the free spins and returns to the primary game. Free spin modes or sequences that provide players with large awards or the potential to win large awards are attractive to players. A need exists to provide new ways to provide awards in one or more free spin modes or sequences.

In recent years, gaming has become a more social leisure activity. Gaming establishments often strive for ways to enable players to work together in gaming. Working together creates camaraderie among the players and provides an enhanced gaming experience. Certain secondary or bonus games include a group gaming aspect wherein a plurality of players participate in a group bonus game for one or more bonus awards. Accordingly, there is a continuing need to provide new bonus games which include a group gaming aspect, wherein a plurality of players playing at linked gaming machines participate in a group bonus game for one or more bonus awards.

SUMMARY

In one embodiment, the gaming system and method disclosed herein provides a player one or more modifiers to apply to different game components or characteristics of a game. In one such embodiment, the gaming device enables a player to selectively apply or associate each of a plurality of modifiers to a single game component, to apply a plurality of modifiers to a single game component and apply a plurality of additional modifiers to a plurality of additional game components or to apply the plurality of modifiers to a plurality of different game components. Such an embodiment enables the player to determine how many modifiers, if any, to apply to an unknown game component by considering the ramifications of applying a plurality of modifiers to a plurality of unknown game components or applying a plurality of modifiers to a single, unknown game component. That is, the gaming device provides the player one or more decisions regarding how volatile the player wants the game and their overall gaming experience to be. Accordingly, the gaming device and method disclosed herein provides a player with a new and exciting game that enables the player to weigh options and explore the consequences of selecting those options in accumulating one or more awards.

In one embodiment, upon a suitable triggering event, the gaming device determines a number or quantity of modifiers to provide to the player. For example, the gaming device displays and provides a player two distinct or selectable modifiers of 2× each. In one embodiment, the quantity of modifiers provided and which modifiers are provided to the player are independent of any amount wagered by the player. In another embodiment, the number of modifiers to provide is determined based on the triggering event. In different embodiments, the number of modifiers to provide is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

After providing one or more modifiers, the gaming device initially displays one or more of a plurality of different components or characteristics of the game to be provided. For example, the gaming device initially displays to the player a free spin game which includes a first game component of six free spins, a second game component of an applicable multiplier of 2× per free spin and a third game component of a starting or minimum award amount of fifteen credits.

After initially displaying one or more of the different game components, the gaming device masks or conceals the game components. The gaming device displays the plurality of game components being shuffled into a different configuration such that the player does not know which shuffled game components are which. Such masking and shuffling provides that the player is unaware of which game components the player selects to modify and rather is only aware of the quantity of modifiers to apply to each unknown game component.

In one embodiment, the gaming device enables the player to associate any provided modifiers with any of the shuffled game components. In this embodiment, for each provided modifier, the gaming device enables the player to associate or apply that provided modifier to one of the shuffled game components, regardless of if any other provided modifiers were previously associated with or applied to that shuffled game component. Accordingly, the gaming device and method disclosed herein enables a player to determine whether to concentrate a plurality of modifiers on a single masked game component (and thus greatly increase the modification, of that game component) or distribute the plurality of modifiers across a plurality of different masked game components.

After the player associates each provided modifier with one of the masked game components, in one embodiment, the gaming device reveals which game components the player associated with which modifiers. For each revealed game component which the player decided to apply at least one modifier to, the gaming device applies each associated modifier to result in a modified game component.

In a first example, if the player decides to distribute the two 2× modifiers amongst a plurality of game components, the player picks two different masked game components to apply one 2× modifier to each. In this example, the gaming device reveals that the player selectively associated one 2× modifier with the revealed game component of six free spins and also selectively associated another 2× modifier with the revealed game component of a starting award amount of fifteen credits. Accordingly, those game components are modified such that the gaming device will provide the player twelve free spins and a starting award amount of thirty credits in this first example free spin game. In a second example, if the player decides to concentrate the provided modifiers on a single masked game component, the player picks one of the masked game components to apply both 2× modifiers. In this example, the gaming device reveals that the player selectively associated both 2× modifiers with the revealed game component of an applicable multiplier of 2× per free spin. Accordingly, this game component is modified such that the gaming device will provide the player six free spins with an applicable multiplier of 8× per free spin in this second example free spin game.

After modifying one or more game components, the gaming device displays one or more plays of the game to the player utilizing any modified game components and any unmodified game components. After displaying the play of the game utilizing any modified game components and any unmodified game components, the gaming device provides the player any awards determined for the play of the game and the game ends.

In the first example described above wherein the player modified the number of free spins from six free spins to twelve free spins (via one 2× modifier) and further modified the starting award from fifteen credits to thirty credits (via one 2× modifier), the gaming device proceeds with displaying to the player the twelve free spins (with the applicable multiplier of 2× for each free spin) to result in an award of twenty-two credits. This award, when added with the modified starting award of thirty credits results in a total award of fifty-two credits which are provided to the player.

In the second example wherein the player modified the applicable multiplier from 2× to 8× (via two 2× modifiers), the gaming device proceeded with displaying to the player the six free spins (with the applicable multiplier of 8× for each free spin) to result in an award of forty-four credits. This award, when added with the unmodified starting award of fifteen credits results in a total award of fifty-nine credits which are provided to the player. As illustrated by these two examples, the player's determination of whether to apply a plurality of provided modifiers to one game component or apply the plurality of provided modifiers to a plurality of game components affects the award provided to the player for the play of the game.

In one embodiment, the gaming system enables a plurality of players at a plurality of linked gaming devices of the gaming system to participate in a group gaming environment. In one such embodiment, the gaming system maintains and causes each of the gaming devices to display a plurality of different masked group game components. For each gaming device, upon a modifier accumulation event, that gaming device provides one or more modifiers and enables the player of that gaming device to apply the provided modifiers to any of the displayed masked group game components. Upon a group bonus triggering event, the gaming system determines and reveals an award for each of the masked group game components. After determining the award for each of the group game components, the gaming system determines and provides a separate award to each player of each gaming device based on the determined award for each group game component and the respective modifiers applied to each of the masked group game components by that player. Accordingly, the gaming system disclosed herein provides a plurality of gaming devices that each participate in a group game including a plurality of masked group game components and determines and provides separate awards to each player of one of the gaming devices based on the amount of modifiers applied to each of the group game components by that player.

In one embodiment, upon the gaming system providing a player at least one modifier, the gaming system enables that player to selectively apply that modifier to a single masked group game component, apply a plurality of modifiers to a single masked group game component, or apply the plurality of modifiers to a plurality of different masked group game components. That is, the gaming system enables each player to independently apply any provided modifiers to any one of the displayed masked group game components regardless of whether any modifiers were previously applied to any of the masked group game components by that player or by another player at another gaming device. In other words, the gaming system independently provides each player with one or more decisions regarding how volatile that player wants the game and their overall gaming experience to be. It should be appreciated that in various embodiments one player's decision regarding volatility does not affect one or any of the other players' choice regarding volatility.

In one embodiment, a plurality of players simultaneously utilize the masked group game components. In this embodiment, the displayed masked group game components are the same for each player. In one example embodiment, upon a first modifier accumulation trigger event for a first gaming device, the first gaming device displays a first masked group gaming component and a second masked group gaming component. Upon a second modifier accumulation trigger event for a second gaming device, the second gaming device displays the same first masked group gaming component and the same second masked group gaming component.

In operation of one embodiment, the gaming system enables a plurality of players at a plurality of gaming devices to play primary games. The gaming system monitors each of the gaming devices for a modifier accumulation event. Upon a modifier accumulation event occurring in association with one or more of the gaming devices, the gaming device displays and provides one or more modifiers. The gaming device enables a player to apply any provided modifiers to any of a plurality of displayed masked group game components. In one example embodiment, after a first player is provided a first 2× modifier and a second player is provided a second 2× modifier, the first player decides to apply the first 2× modifier to a first masked group game component and the second player decides to apply the second 2× modifier to a second different masked group game component. It should be appreciated that in this embodiment, for each gaming device, the gaming system enables the player of that gaming device to apply any modifiers to any of the displayed masked group game components regardless of whether any modifiers were previously applied to any masked group game components. That is, each player's application of any provided modifiers is independent of any other player's application of modifiers. The gaming system proceeds to provide modifiers and enable players to apply the modifiers until a group bonus triggering event occurs.

Upon a group bonus triggering event, the gaming system determines and reveals an award for each of the plurality of masked game components. The gaming system then determines and provides separate awards for each player of each gaming device based on the determined award for each group game component and the amount of modifiers that player applied to the each of the group game components. In the example embodiment described above wherein the first and second players each applied a 2× modifier, the gaming system proceeds with determining and revealing, upon a group bonus triggering event, a 50 credit award for the first masked group game component and a 100 credit award for the second masked group game component. Accordingly, in this example, the gaming system determines and provides a total award of 100 credits for the first player based on the determined 50 credit award for the first masked group game component with the 2× multiplier (i.e., 50 credits for the first masked group game component times the 2× multiplier). It should be appreciated that in this example, the gaming system did not provide any awards based on the 100 credits for the second group game component to the first player because the first player did not apply the 2× multiplier to the second masked group game component. In this example, the gaming system also determines and provides a total award of 200 credits for the second player based on the determined 100 credit award for the second masked group game component (i.e., 100 credits for the second masked group game component times the 2× multiplier).

By enabling each player to independently determine whether to concentrate or stack a plurality of modifiers to apply to one game component or to distribute or spread out the plurality of modifiers to apply to a plurality of game components, the gaming system and method disclosed herein provides each player one or more decisions regarding how volatile that player wants the game and their overall gaming experience to be. Accordingly, the gaming system and method disclosed herein provides players with a new and exciting game that enables each player to independently weigh options and explore the consequences of selecting those options in accumulating one or more awards. Such a configuration increases the players' excitement and enjoyment in playing the gaming system and method disclosed herein.

Additional features and advantages of the present invention are described in, and will be apparent from, the following Detailed Description of the Invention and the figures.

BRIEF DESCRIPTION OF THE FIGURES

FIG. 6 is a chart illustrating the results of the free spin game of FIG. 4F.

FIG. 10B is a chart illustrating the results of the free spin game for each of the plurality of players of FIG. 10A.

DETAILED DESCRIPTION

The present disclosure may be implemented in various configurations for gaming machines, gaming devices or gaming systems, including but not limited to: (1) a dedicated gaming machine, gaming device or gaming system wherein the computerized instructions for controlling any games (which are provided by the gaming machine or gaming device) are provided with the gaming machine or gaming device prior to delivery to a gaming establishment; and (2) a changeable gaming machine, gaming device or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
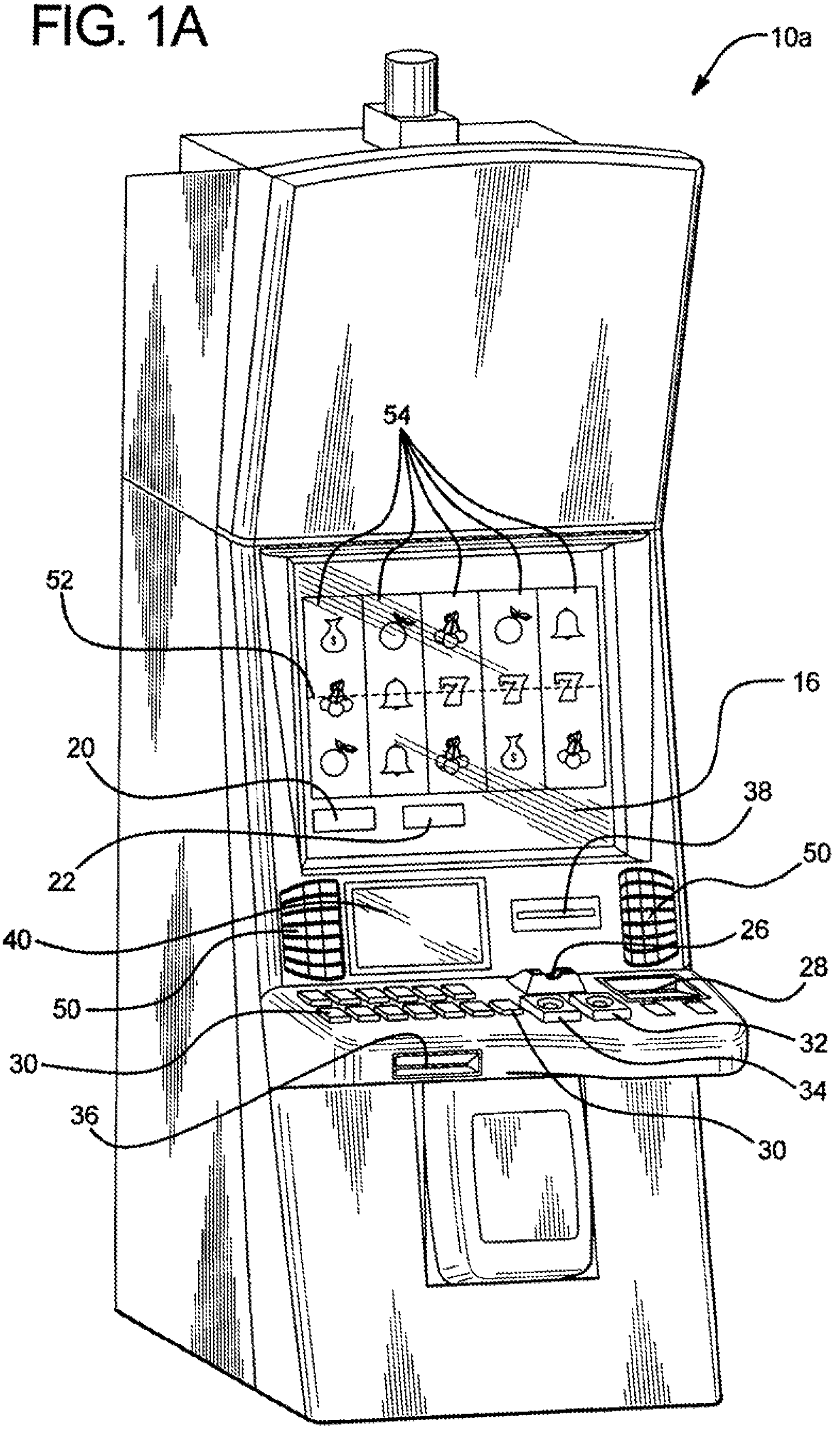
FIG. 1A is a front-side perspective view of one embodiment of the gaming device disclosed herein.
Figure 1B:
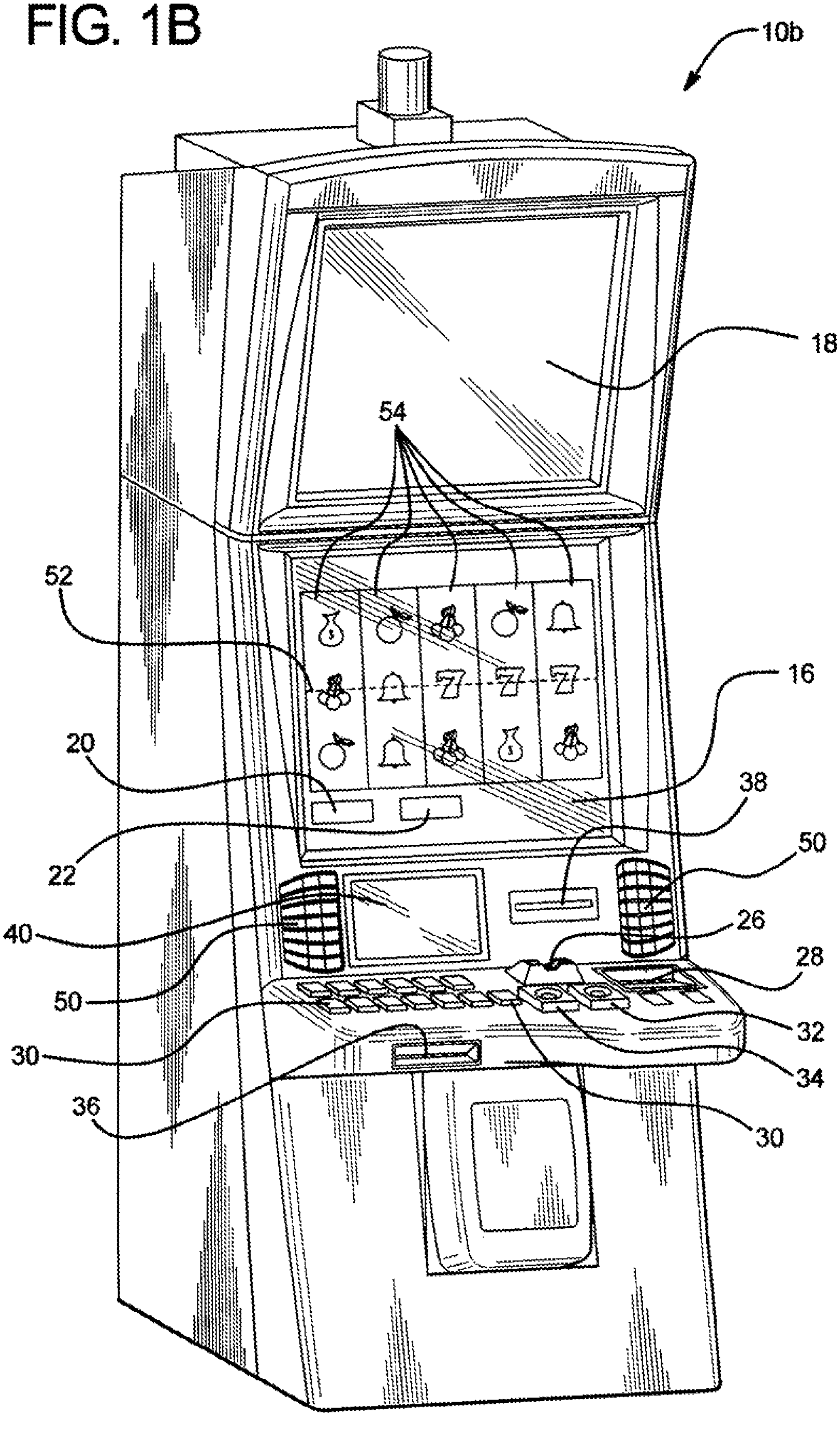
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
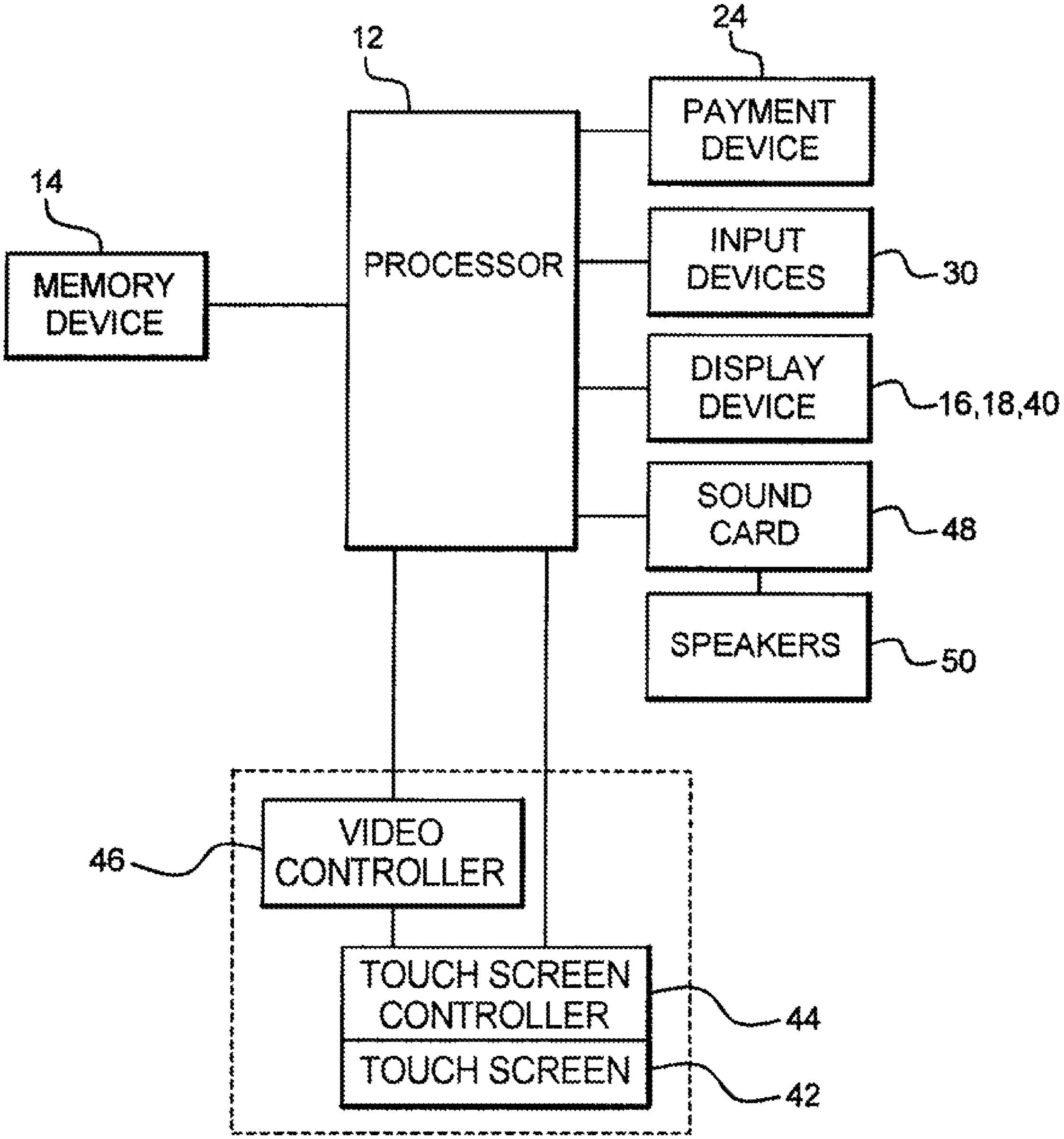
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
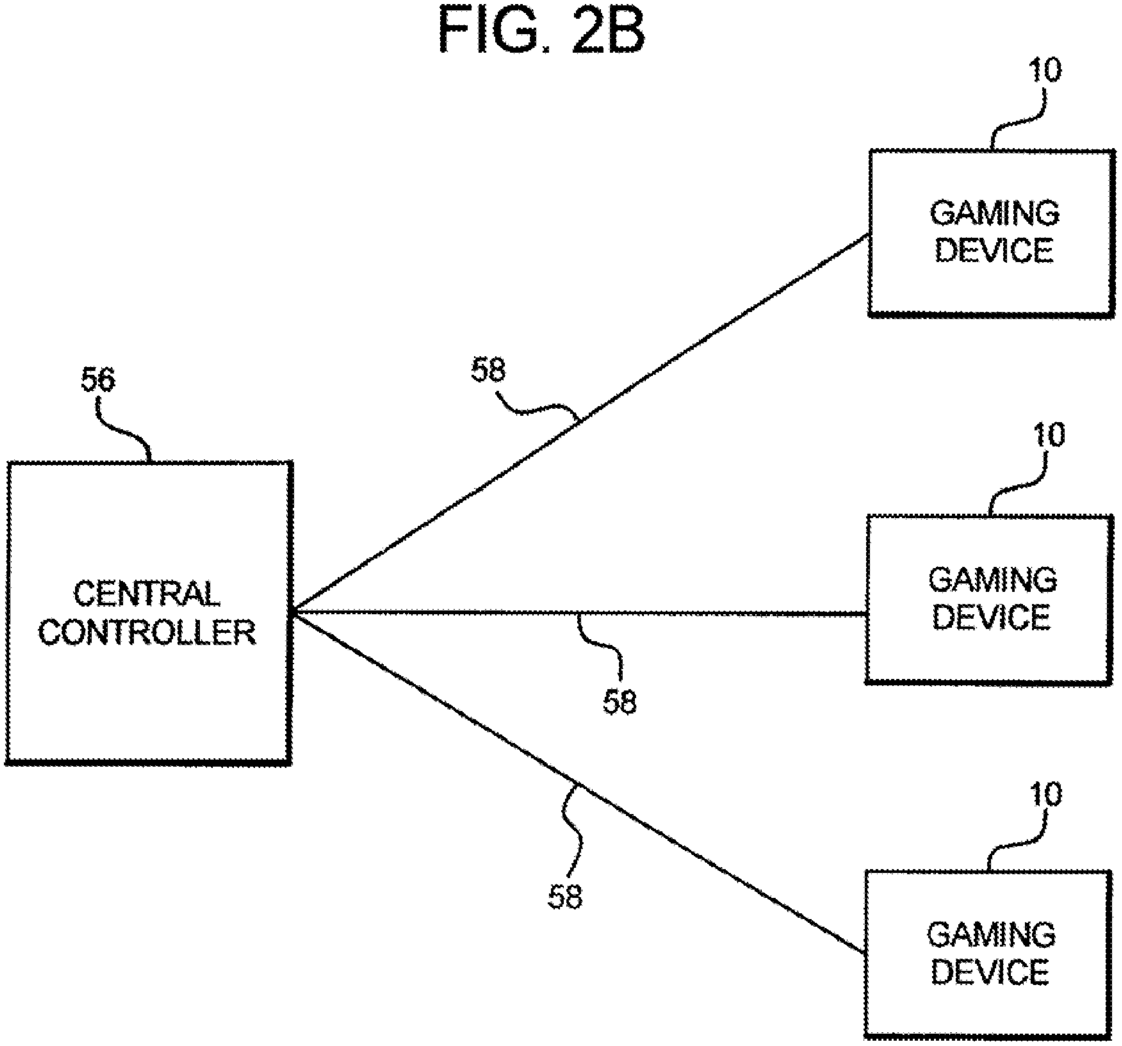
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Modification of Game Components

Figure 3:
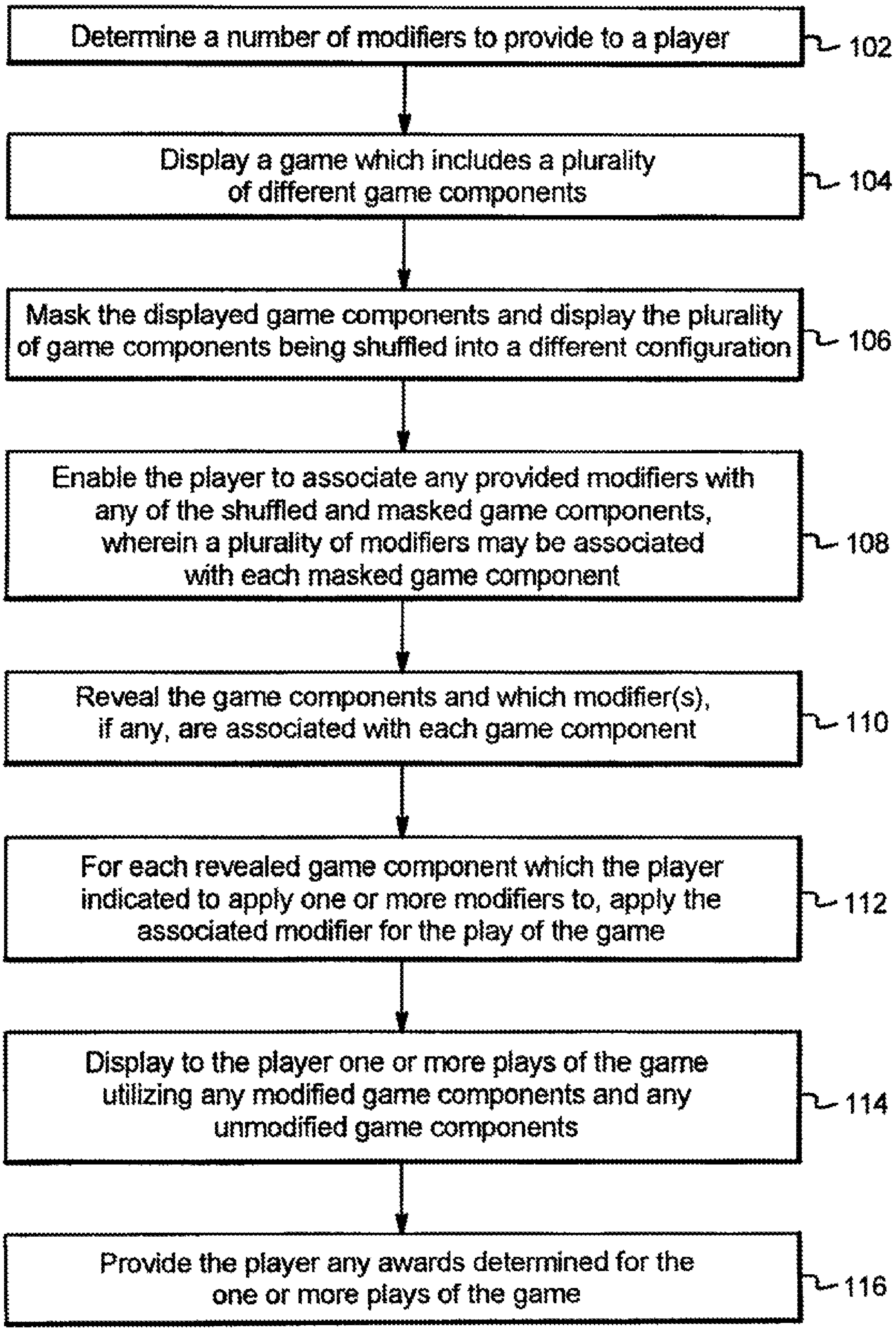
FIG. 3 is a flowchart of one embodiment of the gaming device disclosed herein illustrating a player selectively modifying one or more game components of a free spin game.

In one embodiment, upon a suitable triggering event, the gaming device determines a number or quantity of modifiers to provide to the player as indicated in block 102 of FIG. 3.

In one embodiment, the number of modifiers to provide is determined based on the triggering event. In one such embodiment, the number of modifiers to provide is determined based on a number of designated symbols generated in the play of the primary game, such as generated on the plurality of reels. For example, if the triggering event is the generation of at least three designated symbols scattered at any symbol position on the plurality of reels, the generation of three designated symbols results in providing the player three modifiers, the generation of four designated symbols results in providing the player four modifiers and the generation of five designated symbols results in providing the player five modifiers.

In different embodiments, the number of modifiers to provide is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, each provided modifier is the same (i.e., associated with the same value). In another embodiment, each provided modifier is different (i.e., associated with a different value). In another embodiment, a plurality of the provided modifiers are each different. For example, the gaming device provides the player one 2× modifier, one 3× modifier and one 4× modifier. In different embodiments, the value associated with one, more or each of the provided modifiers is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another embodiment, the quantity of modifiers to provide to the player and/or the value associated with one or more of the provided modifiers is independent of any wager the player places. In these embodiment, the gaming device determines a quantity of modifiers to provide to the player and further determines a value associated with one or more of the provided modifiers regardless of the amount of the player's wager, the timing of the player's wager, the quantity of wagers placed and/or any side bet or side wager placed.

After displaying and providing one or more modifiers to the player, as indicated in block 104 of FIG. 3, the gaming device displays one or more of a plurality of different game components or characteristics of a game. The different displayed game components include, but are not limited to:

1. a quantity of free spins;
2. a quantity of free activations of one or more games;
3. an applicable multiplier for at least one, a plurality or each of the free spins;
4. a starting credit amount (based on a triggering event and/or a wager placed);
5. a quantity of picks in the game;
6. a quantity of selections in the game;
7. a quantity of wild symbols in the game;
8. a quantity of retrigger symbols in the game;
9. a quantity of terminators or termination symbols in the game;
10. a quantity of anti-terminators in the game;
11. a quantity of locking reels in the game;
12. a quantity of locking symbol positions in the game;
13. a quantity of expanding symbols in the game;
14. a quantity of rounds or levels in the game;
15. a quantity of award opportunities in the game;
16. a quantity of progressive awards in the game;
17. a range of available awards in the game;
18. a maximum award in the game;
19. a minimum award in the game;
20. an average expected award in the game;
21. a quantity of active reels in the game;
22. a quantity of active paylines in the game;
23. a quantity of offers in the game;
24. a paytable will be utilized in the game;
25. a quantity of hands of playing cards in the game;
26. any game component disclosed herein; and
27. any other suitable game component.

It should be appreciated that any suitable game incorporating any suitable game component or characteristic may be implemented in accordance with the gaming device and method disclosed herein.

Figure 4A:
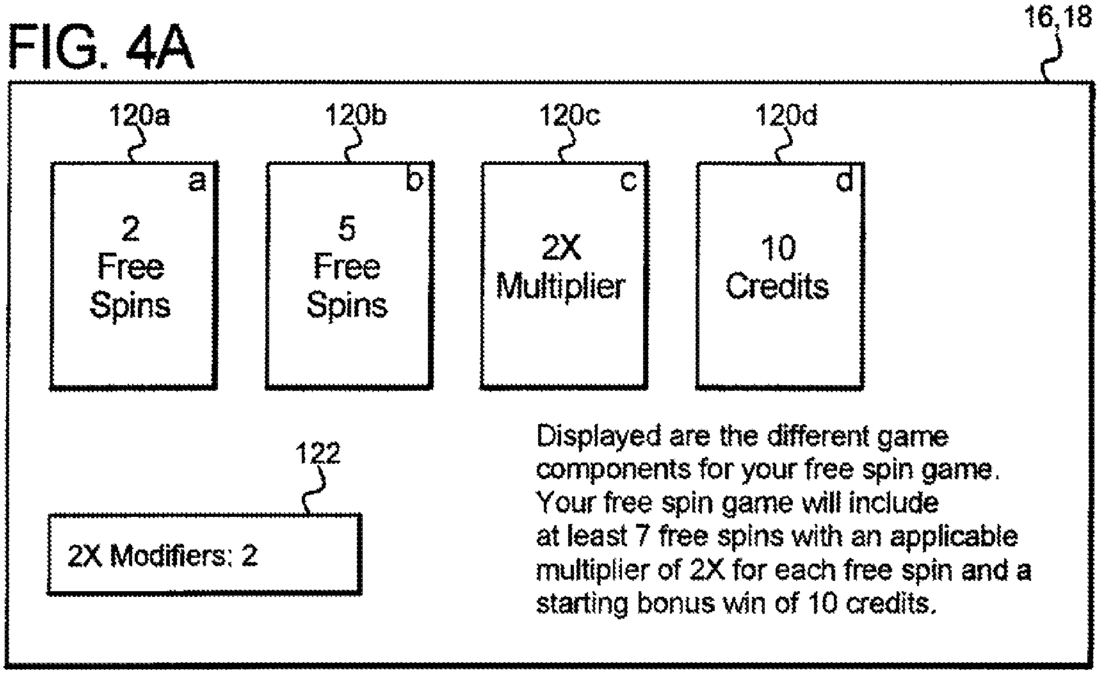
FIGS. 4A, 4B, 4C, 4D, 4E, and 4F are front elevational views of one embodiment of the gaming device disclosed herein illustrating a player selectively modifying a plurality of game components of a free spin game with a plurality of modifiers.

In one example embodiment, as seen in FIG. 4A, upon a suitable triggering event, the gaming device determines to provide two 2× modifiers to a player (indicated in the modifier meter 122) for a free spin game. In this example, the free spin game includes the separate, pre-modified game components or characteristics of two free spins 120*a*, five free spins 120*b*, a 2× multiplier 120*c* and a starting win amount of 10 credits. It should be appreciated that if none of the game components are modified, this free spin game would include seven free spins (i.e., game components 120*a* and 120*b*), with an applicable multiplier of 2× for each free spin (i.e., game component 120*c*) and a starting award meter of 10 credits (i.e., game component 120*d*). Appropriate messages such as "DISPLAYED ARE THE DIFFERENT GAME COMPONENTS FOR YOUR FREE SPIN GAME" and "YOUR FREE SPIN GAME WILL INCLUDE AT LEAST 7 FREE SPINS WITH AN APPLICABLE MULTIPLIER OF 2× FOR EACH FREE SPIN AND A STARTING BONUS WIN OF 10 CREDITS" are provided to the player visually or through suitable audio or audiovisual displays.

After initially displaying the different game components of the game, as indicated in block 106 of FIG. 3, the gaming device masks or conceals the displayed game components and displays the plurality of game components being shuffled into a different configuration. This masking and shuffling of the game components provides that the player does not know which game components are which when the player applies the provided modifiers as described below. Such a configuration provides that the player applies known modifiers to unknown game components which are utilized in determining any award to provide to the player. Such a configuration further provides that the player is knowledgeable regarding the potential awards. It should be appreciated that any suitable manner of hiding from the player which game components are which prior to enabling the player to apply the provided modifiers may be implemented in accordance with the gaming device disclosed herein.

Figure 4B:
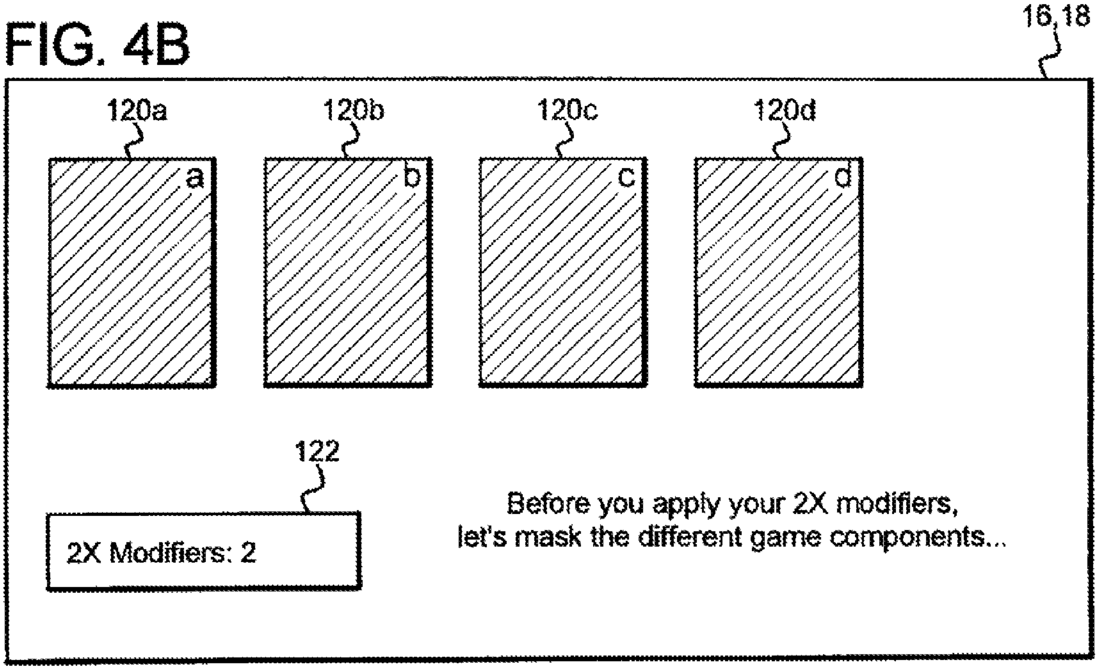
Figure 4C:
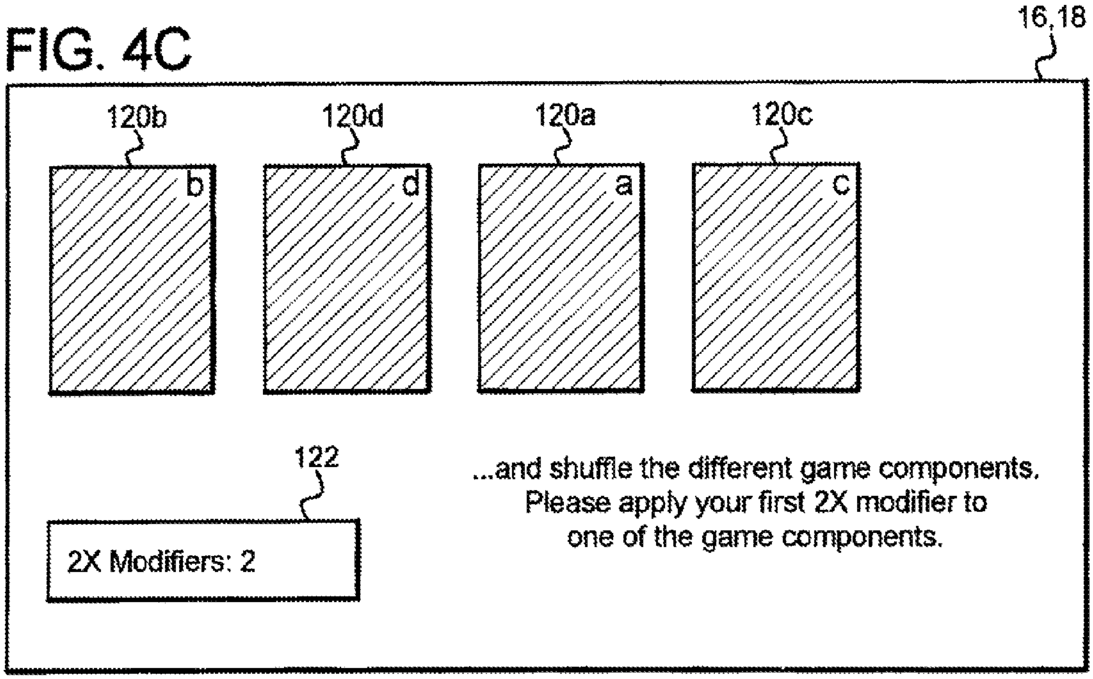

As seen in the example embodiment of FIGS. 4B and 4C, after displaying to the player the plurality of game components for the free spin game, the gaming device masks or conceals the displayed game components and displays the plurality of game components being shuffled into a different configuration. For purposes of illustrating the game components being shuffled, game components 120*a*, 120*b*, 120*c* and 120*d* are also respectively marked a, b, c and d, respectively. It should be appreciated that the game components are masked and the additional markings of a, b, c and d are only to illustrate the shuffling process and are not displayed to the player. Appropriate messages such as "BEFORE YOU APPLY YOUR 2× MODIFIERS, LET'S MASK THE DIFFERENT GAME COMPONENTS . . . " and " . . . AND SHUFFLE THE DIFFERENT GAME COMPONENTS" are provided to the player visually or through suitable audio or audiovisual displays.

As indicated in block 108 of FIG. 3, the gaming device enables the player to associate any provided modifiers with any of the shuffled and masked game components. In this embodiment, for each provided modifier, the gaming device enables the player to associate or apply that provided modifier to one of the shuffled game components, regardless of if any other provided modifiers were previously associated with or applied to that shuffled game component. Accordingly, the gaming device and method disclosed herein enables a player to determine whether to concentrate a plurality of modifiers on a single masked game component (and thus greatly increase the modification of that game component) or distribute the plurality of modifiers across a plurality of different masked game components.

For the example embodiment described above and as seen in FIG. 4C, the gaming device enables the player to associate each of the two provided 2× modifiers with any of the shuffled and masked game components. Appropriate messages such as "PLEASE APPLY YOUR FIRST 2× MODIFIER TO ONE OF THE GAME COMPONENTS", are provided to the player visually or through suitable audio or audiovisual displays.

Figure 4D:
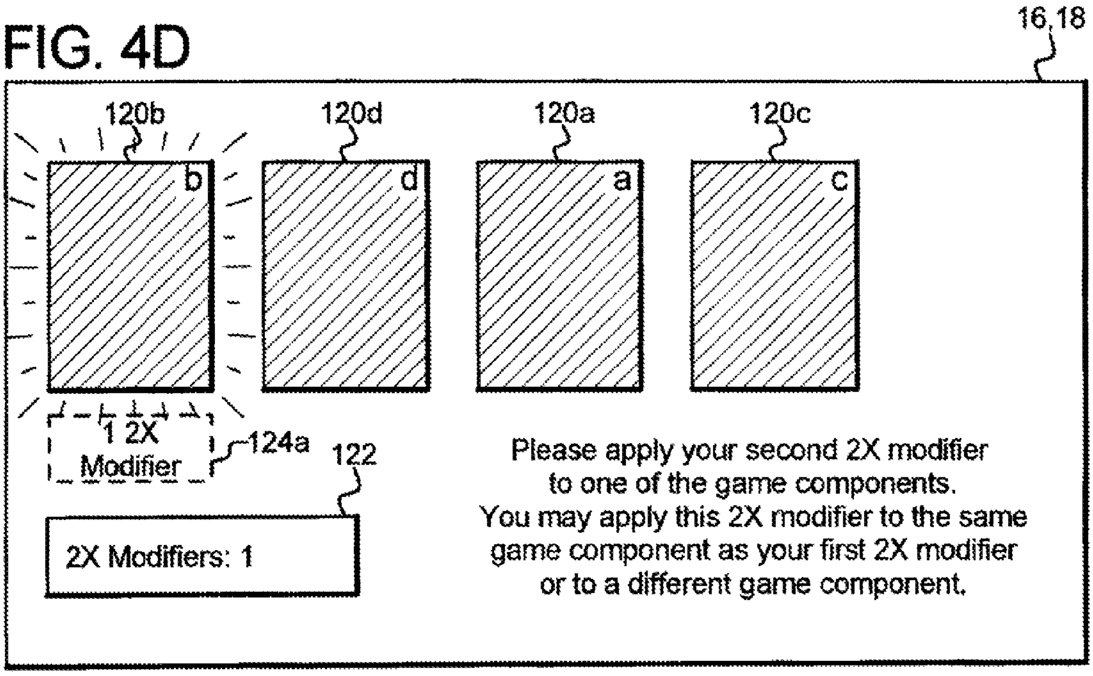

As seen in FIG. 4D, the player selects highlighted masked game component 120*b* to apply the first 2× modifier 124*a*. After determining that the player has at least one unapplied modifier remaining, the gaming device enables the player to apply the next modifier to one of the masked game components (including the same game component previously associated with a modifier). Appropriate messages such as "PLEASE APPLY YOUR SECOND 2× MODIFIER TO ONE OF THE GAME COMPONENTS", and "YOU MAY APPLY THIS 2× MODIFIER TO THE SAME GAME COMPONENT AS YOUR FIRST 2× MODIFIER OR TO A DIFFERENT GAME COMPONENT" are provided to the player visually or through suitable audio or audiovisual displays.

Figure 4E:
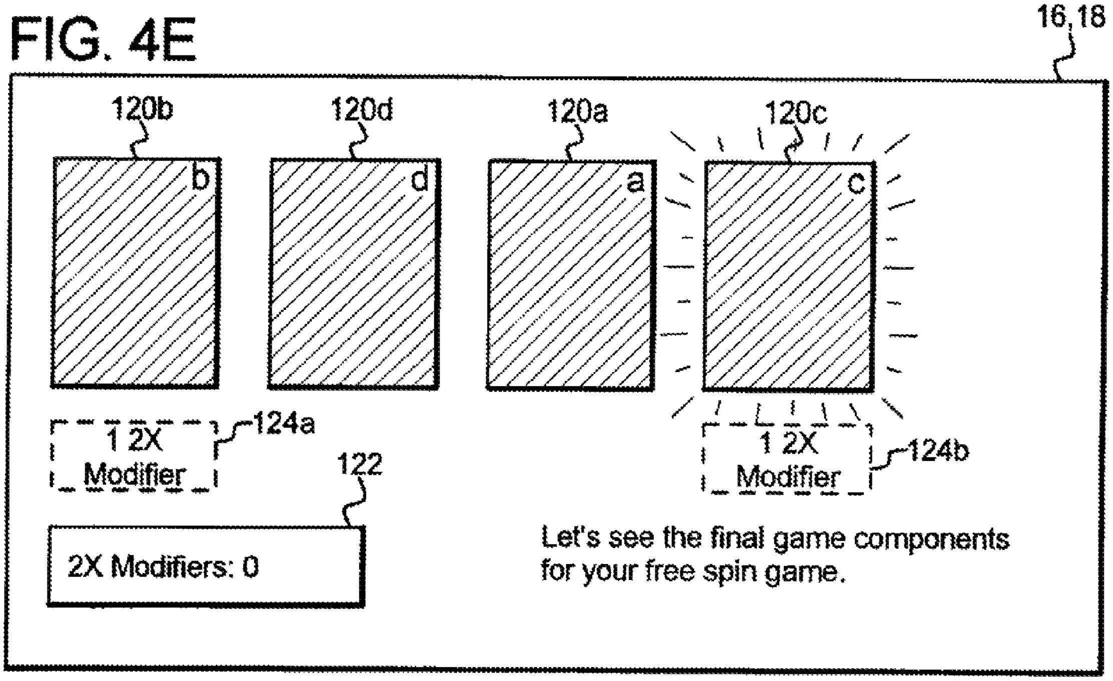

As seen in FIG. 4E, the player selects highlighted masked game component 120*c* to apply the second 2× modifier 124*b*. At this point, the gaming device determines that the player has zero unapplied modifiers remaining and proceeds as described below. Appropriate messages such as "LET'S SEE THE FINAL GAME COMPONENTS FOR YOUR FREE SPIN GAME" are provided to the player visually or through suitable audio or audiovisual displays.

As indicated in block 110 of FIG. 3, after the player indicates which modifiers to apply to or associate with which masked game components, the gaming device unmasks or reveals the game components and which modifier(s), if any, are associated with each game component. For each revealed game component which the player indicated to apply one or more modifiers to, the gaming device applies the associated modifier(s) for the play of the game as indicated in block 112. That is, the gaming device modifies the game components for one or more games to be played based on which game components the player applied the provided modifiers. After modifying the appropriate game components, the gaming device determines the parameters of the game to provide to the player. It should be appreciated that any applied modifier is configured to perform any suitable mathematical function on any revealed game component. That is, the modifiers disclosed herein may be added to one another to result in a modified game component. For example, three separate 2× modifiers individually applied to a game component may result in a total modifier of 6× applied to that game component.

Figure 4F:
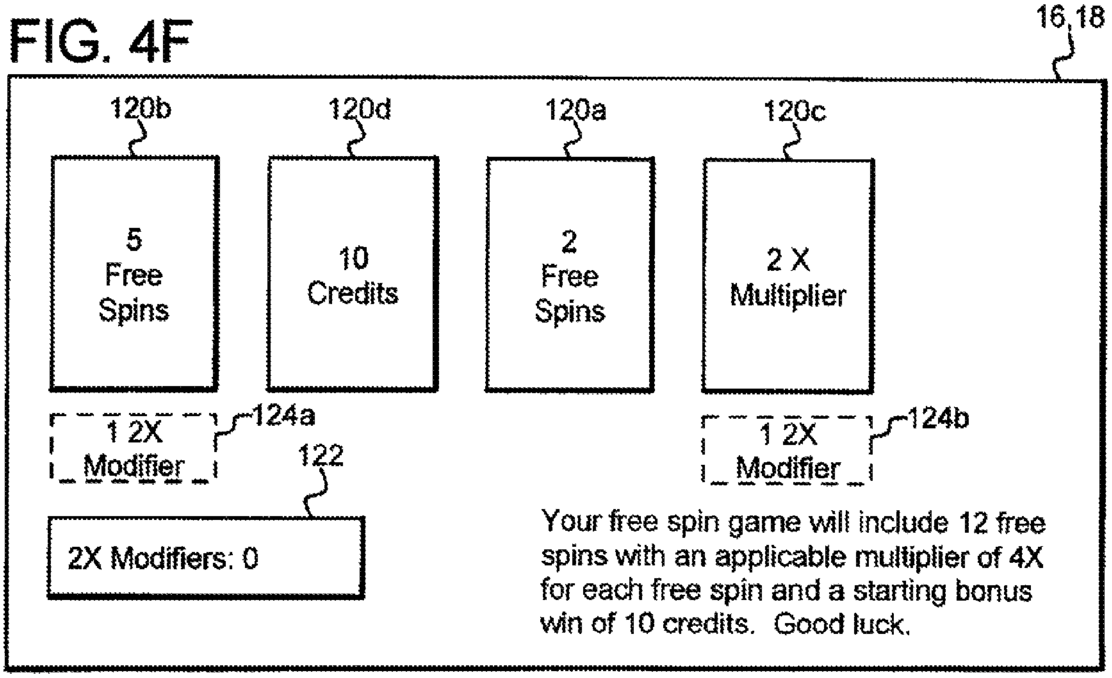

In the example embodiment seen in FIG. 4F, after determining that no unapplied modifiers remain, the gaming device reveals that the player applied the first 2× modifier 124*a* to the game component of five free spins 120*b*. Accordingly, this game component is modified by the first 2× modifier to result in ten free spins. The gaming device also reveals that the player applied the second 2× modifier 124*b* to the game component of a 2× multiplier. Accordingly, this game component is modified by the second 2× modifier to result in a 4× multiplier. In this example, the gaming device determines that, when accounting for any modified game components (i.e., the modified game component of a 4× multiplier and the modified game component of ten free spins) and any unmodified game component (i.e., the unmodified game component of two free spins and the unmodified game component of a starting bonus win of 10 credits), the free spin game will include a total of twelve free spins with an applicable multiplier of 4× for each free spin and a starting bonus award of 10 credits. Appropriate messages such as "YOUR FREE SPIN GAME WILL INCLUDE 12 FREE SPINS WITH AN APPLICABLE MULTIPLIER OF 4× FOR EACH FREE SPIN AND A STARTING BONUS WIN OF 10 CREDITS" and "GOOD LUCK" are provided to the player visually or through suitable audio or audiovisual displays.

After determining the parameters of the game to provide to the player, the gaming device displays to the player one or more plays of such a game utilizing any modified game components and any unmodified game components as indicated in block 114 of FIG. 3. The gaming device provides the player any awards determined for the one or more plays of the game as indicated in block 116.

Figure 5:
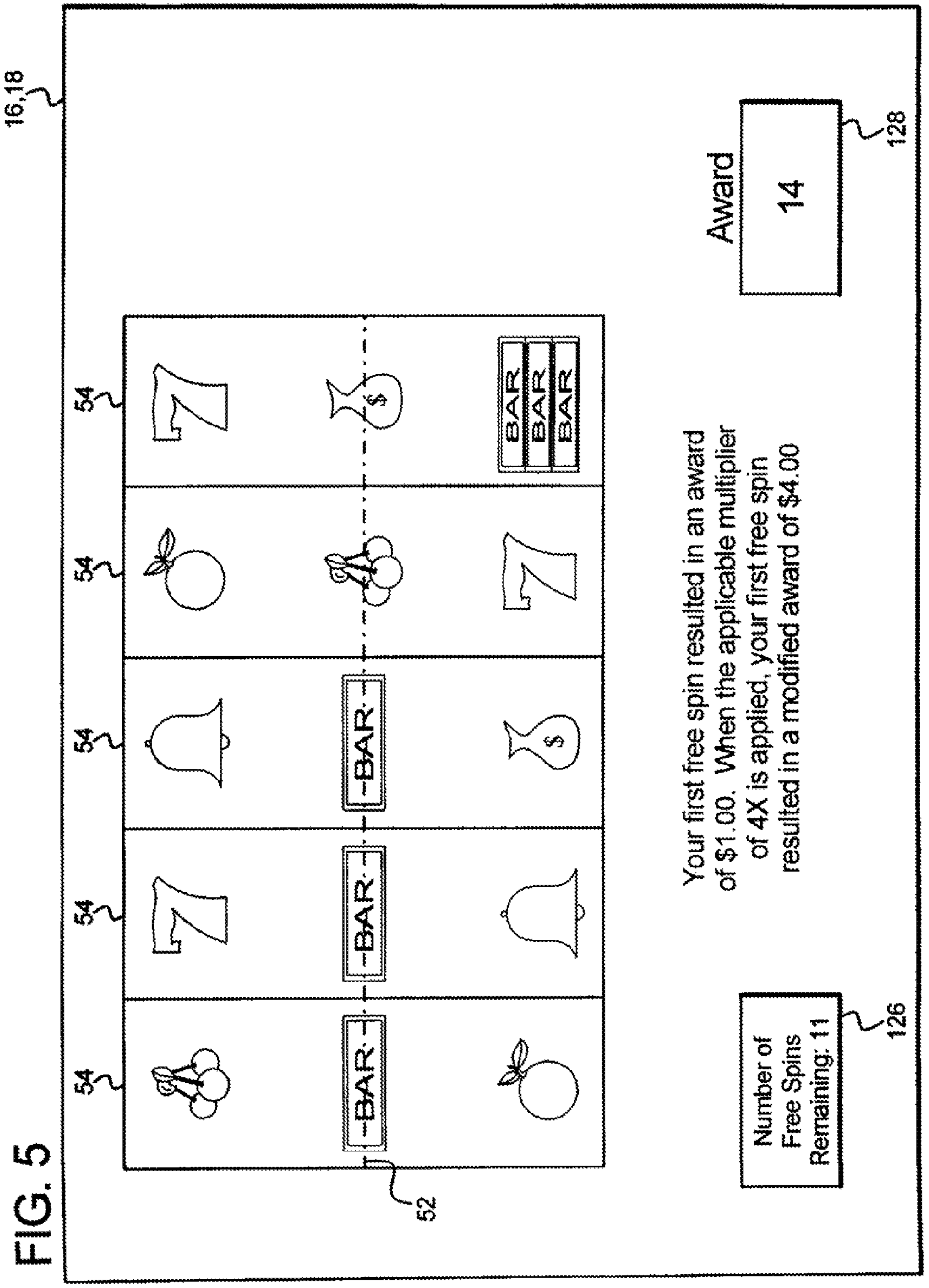
FIG. 5 is a front elevational view of one embodiment of the gaming device disclosed herein illustrating one of the free spins of the free spin game of FIG. 4F provided to the player.

For example, as seen in FIG. 5, for the first free spin of the free spin game, the gaming device generates a plurality of symbols and the gaming device determines the award amount of $1.00 associated with the generated symbol combination of bar symbol-bar symbol-bar symbol generated along payline 52. In this case, the gaming device modifies the determined award amount of $1.00 by the applicable multiplier of 4× to result in an award amount of $4.00 for the first free spin of the free spin game. As seen in award meter or indicator 128, this award amount is combined with the starting bonus win of ten credits or $10.00. As seen in FIG. 5, appropriate messages such as "YOUR FIRST FREE SPIN RESULTED IN AN AWARD OF $1.00" and "WHEN THE APPLICABLE MULTIPLIER OF 4× IS APPLIED, YOUR FIRST FREE SPIN RESULTED IN A MODIFIED AWARD OF $4.00" may be provided to the player visually, or through suitable audio or audiovisual displays.

In this example, since at least one free spin remained in the free spin game (as seen in the number of free spins remaining meter or indicator 126), the gaming device provides the player an additional free spin. As illustrated in FIG. 6, the gaming device continues providing the player free spins in the free spin game until all twelve free spins are provided to the player. It should be appreciated that as seen in FIG. 6, for each free spin, the gaming device modified any determined award by the applicable multiplier of 4× such that the total number of free spins for the free spin game resulted in an award of 36 credits or $36.00 provided to the player. After providing the player all twelve free spins of the free spin game and the determined award, the gaming device returns to a normal game play mode.

Figure 7A:
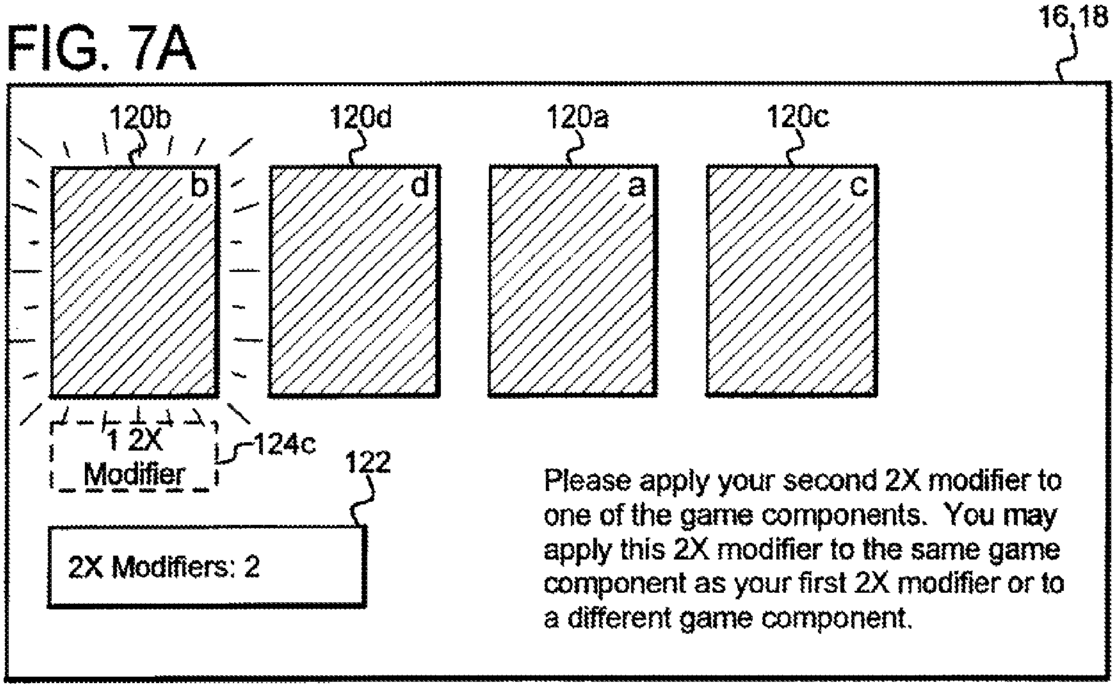
FIGS. 7A, 7B, 7C and 7D are front elevational views of one embodiment of the gaming device disclosed herein illustrating a player selectively modifying one game component of a free spin game with a plurality of modifiers.
Figure 7B:
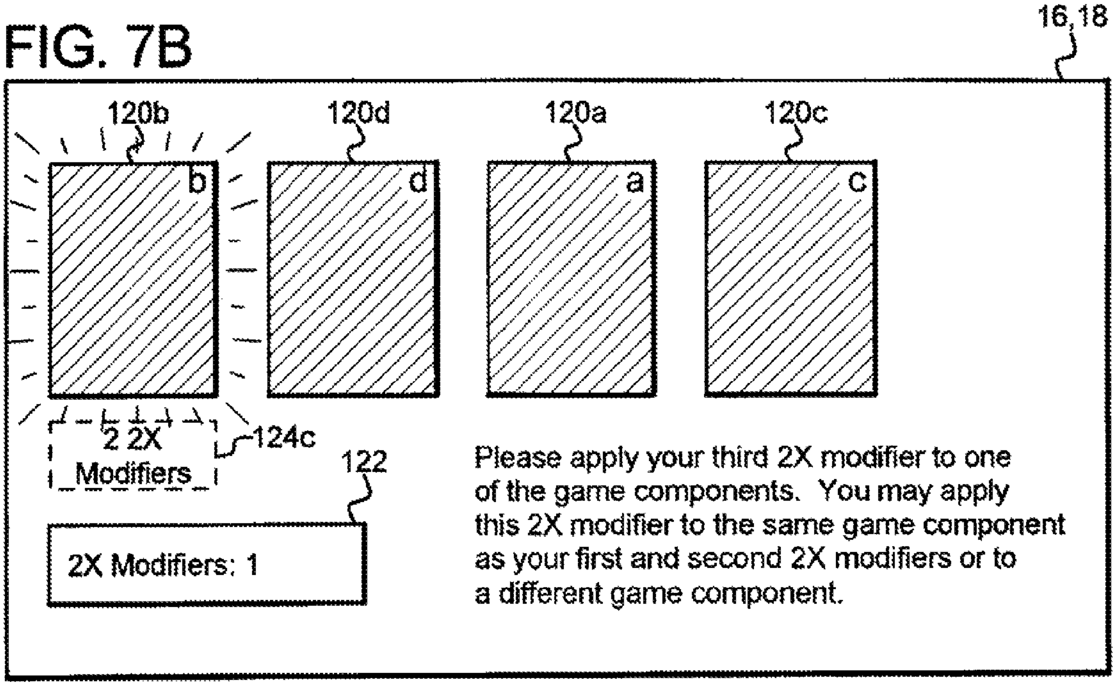
Figure 7C:
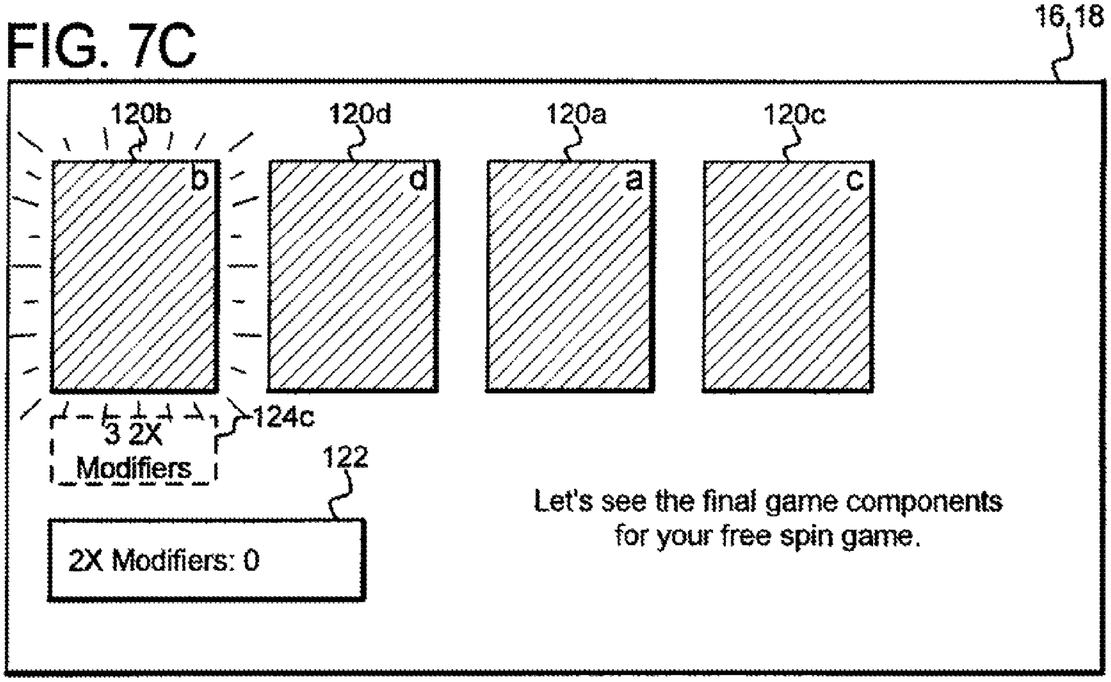

As described above, the gaming device and method disclosed herein enables a player to associate a plurality of modifiers with one masked game component to increase the modification of that game component. The example embodiment illustrated in FIG. 7A picks up with the player having applied a first 2× modifier to masked game component 120*b* and having two 2× modifiers remaining 122. In this example, after determining that the player has at least one unapplied modifier remaining, the gaming device enables the player to apply the second 2× modifier to one of the game components, including masked game component 120*b*. Appropriate messages such as "PLEASE APPLY YOUR SECOND 2× MODIFIER TO ONE OF THE GAME COMPONENTS", and "YOU MAY APPLY THIS 2× MODIFIER TO THE SAME GAME COMPONENT AS YOUR FIRST 2× MODIFIER OR TO A DIFFERENT GAME COMPONENT" are provided to the player visually or through suitable audio or audiovisual displays.

In this example, as seen in 7B, the player selects highlighted game component 120*b* to apply the second 2× modifier, wherein this selected game component is the same masked game component as the game component the player previously applied the first 2× modifier. After determining that the player has at least one unapplied modifier remaining, the gaming device again enables the player to apply an unapplied modifier to one of the masked game components (including the same game component previously associated with a modifier). Appropriate messages such as "PLEASE APPLY YOUR THIRD 2× MODIFIER TO ONE OF THE GAME COMPONENTS", and "YOU MAY APPLY THIS 2× MODIFIER TO THE SAME GAME COMPONENT AS YOUR FIRST AND SECOND 2× MODIFIERS OR TO A DIFFERENT GAME COMPONENT" are provided to the player visually or through suitable audio or audiovisual displays.

In this example, as seen in 7C, the player selects highlighted game component 120*b* to apply the third 2× modifier, wherein this selected game component is the game component the player previously applied the first and second 2× modifiers. At this point, after determining that the player has zero unapplied modifiers remaining, the gaming device proceeds in revealing to the player which game components the player selected to modify. Appropriate messages such as "LET'S SEE THE FINAL GAME COMPONENTS FOR YOUR FREE SPIN GAME" are provided to the player visually or through suitable audio or audiovisual displays.

Figure 7D:
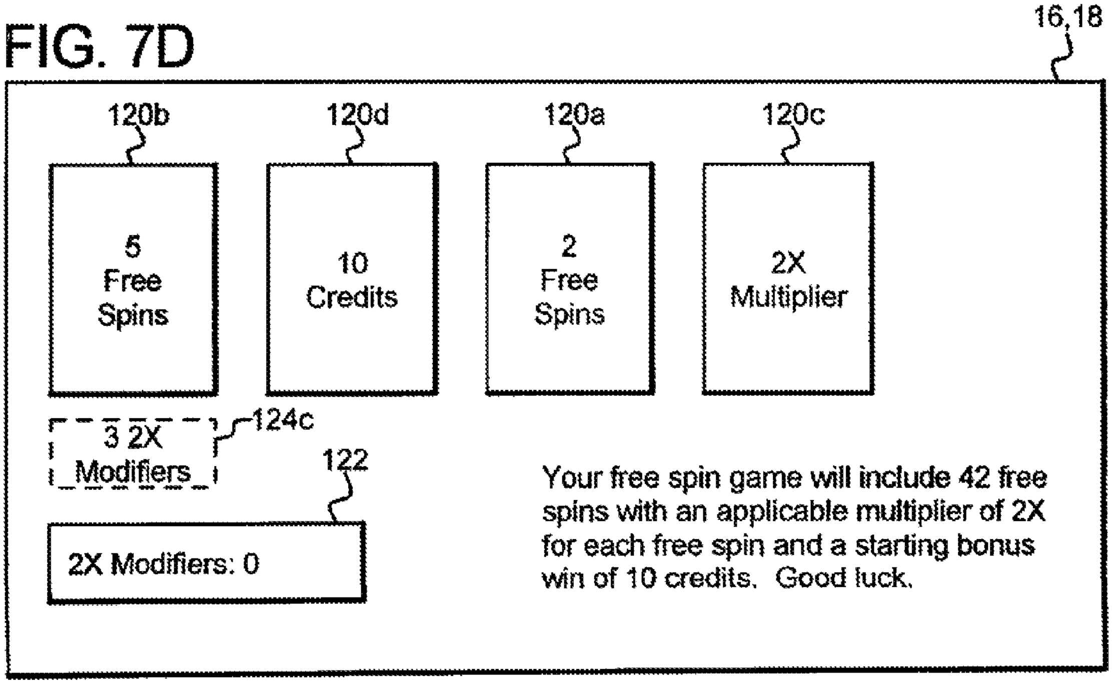

In the example embodiment seen in FIG. 7D, after determining that no unapplied modifiers remain, the gaming device reveals that the player applied the first, second and third 2× modifiers to the game component of five free spins 120*b*. Accordingly, this game component is modified by these 2× modifiers to result in forty free spins. In this example, when accounting for any modified game components (i.e., the modified game component of forty free spins) and any unmodified game component (i.e., the unmodified game component of two free spins, the unmodified game component of a 2× multiplier, and the unmodified game component of a starting bonus win of 10 credits), the gaming device determines that the free spin game will include a total of forty-two free spins with an applicable multiplier of 2× for each free spin and a starting bonus award of 10 credits. Appropriate messages such as "YOUR FREE SPIN GAME WILL INCLUDE 42 FREE SPINS WITH AN APPLICABLE MULTIPLIER OF 2× FOR EACH FREE SPIN AND A STARTING BONUS WIN OF 10 CREDITS" and "GOOD LUCK" are provided to the player visually or through suitable audio or audiovisual displays. It should be appreciated that had the player applied the three 2× modifiers to the game component of a 2× multiplier, the gaming device would have provided the player a free spin game which includes seven free spins with an applicable multiplier of 16× for each free spin and a starting bonus award of ten credits. It should be further appreciated that had the player applied the three 2× modifiers to the game component of a starting bonus award of ten credits, the gaming device would have provided the player a free spin game which includes seven free spins with an applicable multiplier of 2× for each free spin and a starting bonus award of eighty credits.

As described above, after determining the parameters of the game to provide to the player, the gaming device displays to the player one or more plays of such a game utilizing any modified game components and any unmodified game components. In this example, any determined awards for the forty-two free spins are provided to the player and the gaming device returns to a normal game play mode.

In one alternative embodiment, the gaming device applies the modified game components for part, but not all of the game provided. For example, if the player applied three 2× modifiers to a game component of an applicable multiplier of 2× and further applied one 2× modifier to a game component of five free spins, the gaming device provides the player five free spins with an applicable multiplier of 16× (2× default multiplier×2× first modifier×2× second modifier×2× third modifier) and five free spins with an applicable multiplier of the default 2× multiplier. In different embodiments, which parts of the game the gaming device applies the modified game components is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one alternative embodiment (not shown), the gaming device initially displays zero, one or more of the game components and initially masks one or more of the game components. In this embodiment, rather than initially displaying each of the game components of the game to be played (prior to masking and shuffling such game components), the gaming device masks one or more of the game components and only reveals these initially masked game components after the player has applied the provided modifiers. In one such embodiment, prior to enabling the player to apply any modifiers to any game components, the gaming device displays to the player a list or legend of which game components may be modified. In different embodiments, the number of game components initially masked and/or initially displayed to the player is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria. In different embodiments, which game components are initially masked and which game components are initially displayed to the player is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another alternative embodiment, the gaming device initially displays one or more of the game components and initially masks zero, one or more of the game components. In this embodiment, rather than masking and shuffling each of the game components of the game to be played, the gaming device displays one or more game components prior to enabling the player to apply any provided modifiers. This embodiment increases the player's excitement and enjoyment by enabling the player to apply one or more modifiers to at least one known game component or apply one or more modifiers to at least one unknown game component. In different embodiments, the number of game components which are revealed prior to enabling the player to apply any provided modifiers is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria. In different embodiments, which game components are initially masked and which game components are displayed prior to enabling the player to apply any provided modifiers is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming device reveals which modifiers are associated with which game components as the game is played. The gaming device sequentially reveals each game component as the player applies each modifier to a masked game component. In one example embodiment, the gaming device determines to provide three 2× modifiers to a player. In this example, upon the application of a first 2× modifier to a first game component, the gaming device reveals the first game component. After the gaming device reveals the first game component, the player applies a second 2× modifier to a second game component. Upon the application of the second 2× modifier to the second game component, the gaming device reveals the second game component. After the gaming device reveals the second game component, the player applies a third 2× modifier to a third game component. Upon the application of the third 2× modifier to the third game component, the gaming device reveals the third game component.

In another embodiment, the gaming device places a limit on the number of modifiers which may be applied to one or more game components. In this embodiment, if a player applied a quantity of modifiers to a game component which reaches the limit for that game component, the gaming device prohibits the player from applying any further modifiers to that game component. In different embodiments, which game components which the gaming device places a limit on the number of modifiers which may be applied is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria. In different embodiments, the quantity or number of modifiers which may be applied to one or more game components is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, the award provided to the player is based on the player's wager. In one such embodiment, the number of modifiers to provide to the player is based on the player's wager. In another such embodiment, the value of a modifier to provide to the player is based on the player's wager. In another such embodiment, the value of the game components is based on the player's wager.

In another embodiment, the gaming device disclosed herein includes a game including, a first game component, a second, different game component, and a quantity of modifiers. In this embodiment, for each modifier, the gaming device enables a player to apply the modifier to the first game component, the second game component or a combination of the first game component and the second game component. If the player applied the modifiers to the first game component, the gaming device modifies the first game component by each applied modifier, and generates a first game outcome, wherein the generated game outcome is based on the modified first game component and the second game component. If the player applied the modifiers to the second game component, the gaming device modifies the second game component by each applied modifier, and generates a second game outcome, wherein the generated game outcome is based on the first game component and the modified second game component. If the player applied the modifiers to the first game component and the second game component: the gaming device modifies the first game component by each modifier applied to the first game component, modifies the second game component by each modifier applied to the second game component, and generates a third game outcome, wherein the generated game outcome is based on the modified first game component and the modified second game component. In this embodiment, the gaming device determines any award based on any generated game outcome and provides any determined award to the player.

Group Game Components

Figure 8:
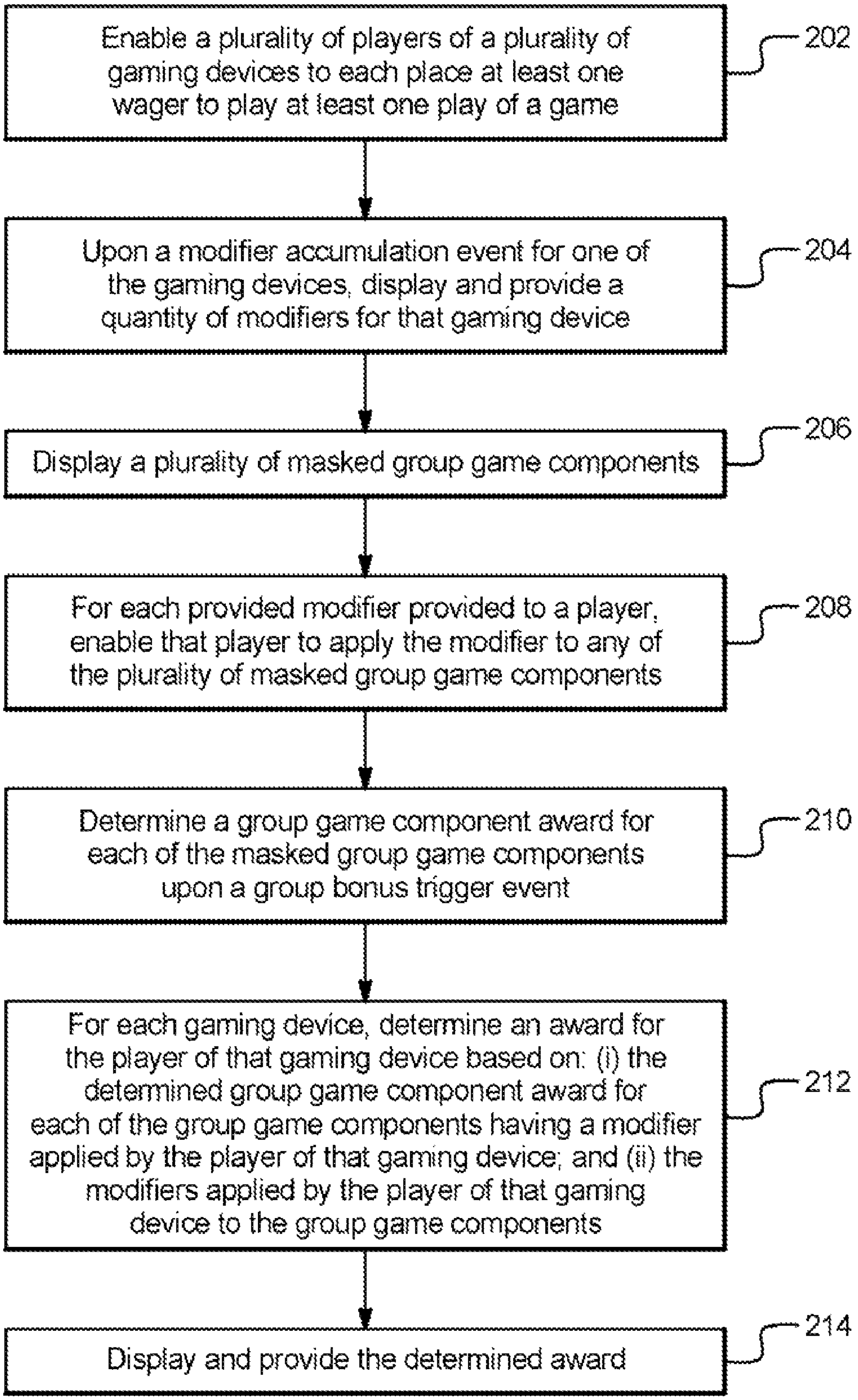
FIG. 8 is a flowchart of one embodiment of the gaming system disclosed herein illustrating each of a plurality of gaming devices determining an award for the player of that gaming device based on the determined group game component award for each of the masked group game components and the modifiers applied by the player of that gaming device to the masked group game components.

In one embodiment, the gaming system enables a plurality of players of a plurality of gaming devices to each place at least one wager to play at least one play of a game as indicated in block 202 of FIG. 8. The gaming system monitors each of the gaming devices for a modifier accumulation event.

Upon a modifier accumulation event for one of the gaming devices, that gaming device displays and provides a quantity of modifiers as indicated in block 204 of FIG. 8. In one embodiment, upon a modification accumulation event, a plurality of the gaming devices each provide to the player of that gaming device one or more modifiers. In one embodiment, upon a modification accumulation event, each of the gaming devices provide to the player of that gaming device one or more modifiers.

As indicated in block 206 of FIG. 8, in addition to providing a quantity of modifiers, the gaming system displays a plurality of different masked group game components. In this embodiment, the plurality of players of the gaming devices simultaneously utilize the masked group game components. The plurality of different masked group game components are associated with a plurality of different group game component awards which are determined and revealed for the plurality of masked group game components. Each of the plurality of different masked group game component awards are associated with an average expected value. In one embodiment, the plurality of different masked group game components have the same average expected value. In another embodiment, the plurality of different masked group game components have different average expected values.

As indicated in block 208 of FIG. 8, for each provided modifier provided to a player, the gaming system enables that player to apply the modifier to any of the plurality of masked group game components.

The gaming system monitors each of the gaming devices for a group bonus triggering event. Upon a group bonus triggering event, the gaming system determines a group game component award for each of the masked group game components as indicated in block 210 of FIG. 8. In one embodiment, a group bonus triggering event occurs in association with a displayed event of a play of a primary game at one or more of the gaming devices in the gaming system. In another embodiment, a group bonus triggering event occurs independent of any displayed event in any play of any primary game at any of the gaming devices in the gaming system. In one embodiment, the controller determines when to trigger the group bonus triggering event.

As indicated in block 212 of FIG. 8, each gaming device determines an award for the player of that gaming device based on: (i) the determined group game component award for each of the group game components having a modifier applied by the player of that gaming device; and (ii) the modifiers applied by the player of that gaming device to the group game components. The gaming system displays and provides the determined award as indicated in block 214.

Referring to FIGS. 9A to 9D, this example embodiment generally shows an example illustrating the gaming system maintaining and causing a plurality of gaming devices to display a plurality of different masked group game components. For each gaming device that provides a modifier, that gaming device enables the player of that gaming device to apply that modifier to any of the masked group game components. Upon a group bonus triggering event, the gaming system determines and reveals an award for each of the masked group game components. In this example embodiment, each of the determined awards for each of the group game components are credit values. The gaming system then determines and provides a separate award to each of the players of the gaming devices, wherein each separate award is based on the determined award for each group game component having a modifier applied by the player of that gaming device and the respective modifiers applied to each of the group gaming components by that player. That is, in this example embodiment, for each player, the gaming system does not provide any awards based on a particular determined group game component award if that player did not apply any modifiers to that particular group game component.

Figure 9A:
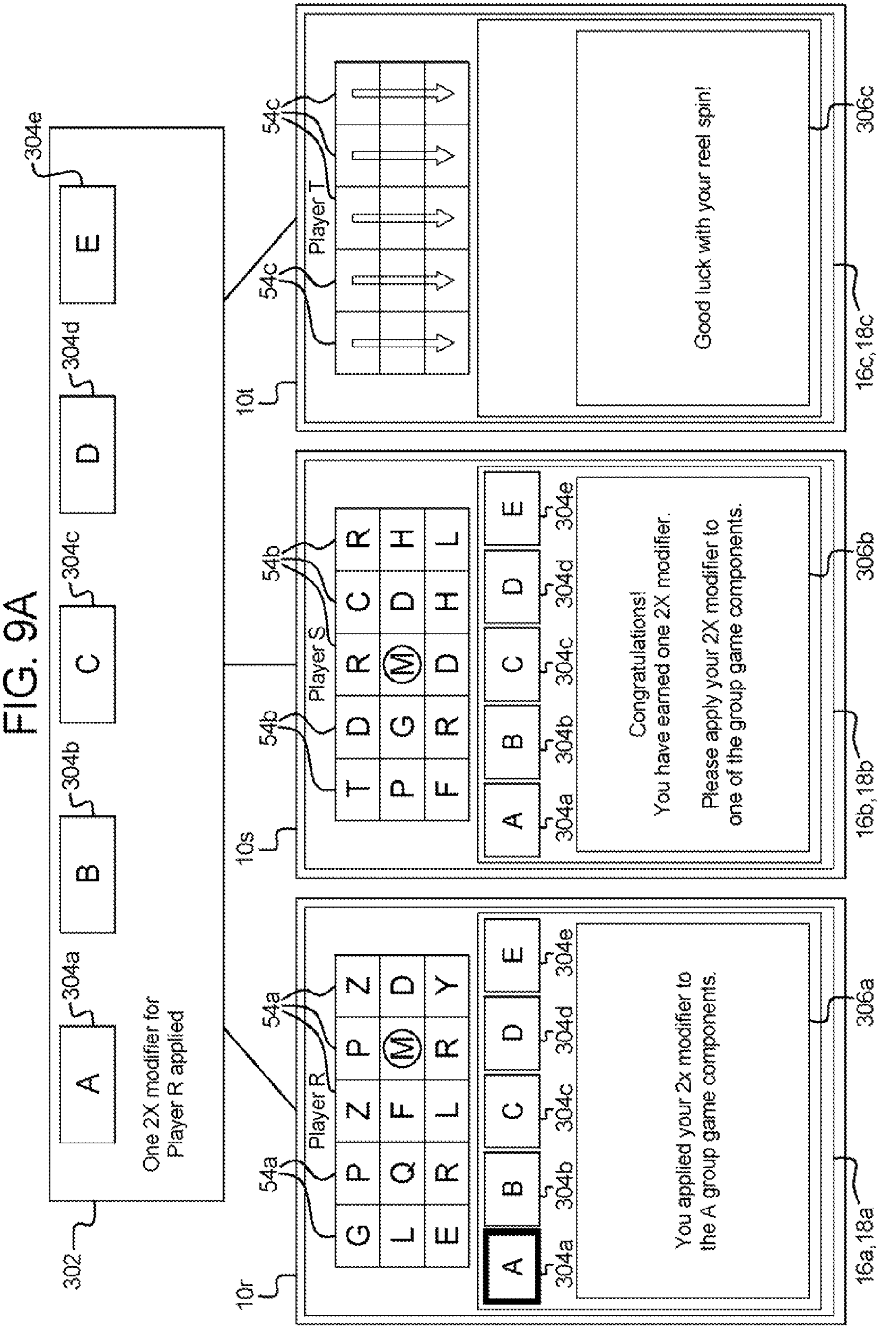
FIGS. 9A, 9B, 9C and 9D are diagrammatic front views of one embodiment of the gaming system disclosed herein illustrating each of a plurality of gaming devices determining an award for the player of that gaming device based on the determined group game component award for each of the masked group game components and the modifiers applied by the player of that gaming device to the masked group game components.

As illustrated in FIG. 9A, the gaming system includes a plurality of gaming devices 10*r*, 10*s*, and 10*t*. Gaming device 10*r* includes a display device 16*a* or 18*a* which displays a slot game which includes a plurality of reels 54*a*. Gaming device 10*s* includes a display device 16*b* or 18*b* which displays a slot game which includes a plurality of reels 54*b*. Gaming device 10*t* includes a display device 16*c* or 18*c* which displays a slot game which includes a plurality of reels 54*c*.

In this example embodiment, the plurality of gaming devices 10*r*, 10*s*, and 10*t* are operatively connected to a group display device 302. As illustrated in FIG. 9A, the group display device 302 displays a plurality of masked group game components 304*a*, 304*b*, 304*c*, 304*d* and 304*e*. The gaming system displays the plurality of masked group game components 304*a*, 304*b*, 304*c*, 304*d* and 304*e* as A, B, C, D, and E, respectively.

In this example embodiment, the plurality of players of the gaming devices simultaneously utilize the masked group game components 304*a*, 304*b*, 304*c*, 304*d* and 304*e*. That is, more specifically, the A masked group game component 304*a* utilized by player R is the same A masked group game component utilized by player S and player T.

In operation of this example embodiment, the gaming system enables a plurality of players of the gaming devices 10*r*, 10*s*, and 10*t* to each place a wager to play at least one play of a game. As illustrated in FIG. 9A, upon receiving the wager for player T (not shown), the gaming device 10*t* causes the plurality of reels 54*c* to spin. An appropriate message such as "GOOD LUCK WITH YOUR REEL SPIN!"" is provided to player T visually, such as in the message display 306*c*, or through suitable audio or audiovisual displays.

In this example embodiment, the gaming system monitors each of the gaming devices 10*r*, 10*s*, and 10*t* for a modifier accumulation event. Upon an occurrence of a modifier accumulation event for one of the gaming devices, the gaming system provides a quantity of modifiers to the player of that gaming device. In this example embodiment, the modifier accumulation event is based on a number of designated symbols generated in the play of the game. More specifically, for each of the gaming devices, the modifier accumulation event occurs if that gaming device generates at least one "M" symbol on the plurality of reels for that gaming device. In this example embodiment, for each gaming device, the number of modifiers to provide is based on the number of "M" symbols generated on the plurality of reels for that gaming device. More specifically, in this example embodiment, each gaming device provides a 2× modifier to the player of that gaming device for each generated "M" symbol of that gaming device. As illustrated in FIG. 9A, the gaming device 10*r* provided a 2× modifier to player R for the one "M" symbol generated on the plurality of reels 54*a*. Gaming device 10*s* provided a 2× modifier to Player S for the one "M" symbol generated on the plurality of reels 54*b*. It should be appreciated that gaming device 10*t* has not provided any modifiers to Player T because the plurality of reels 54*c* has not generated any "M" symbols.

In this example embodiment, for each gaming device that provides a modifier, that gaming device displays the plurality of different masked group game components to the player of that gaming device. As illustrated in FIG. 9A, display device 16*a*, 18*a* displays the plurality of different masked group game components 304*a*, 304*b*, 304*c*, 304*d* and 304*e* because the gaming device 10*r* provided player R with a modifier. Display device 16*b*, 18*b* displays the plurality of different masked group game components 304*a*, 304*b*, 304*c*, 304*d* and 304*e* because the gaming device 10*s* provided player S with a modifier. It should be appreciated that the display device 16*c*, 18*c* does not display the plurality of different modifiers because the gaming device 10*t* has not provided a modifier to player T.

In this example embodiment, for each provided modifier provided to a player, the gaming system enables that player to apply that modifier to any of the plurality of masked group game components. As illustrated in FIG. 9A, the gaming system enables player S to apply the provided 2× modifier to any of the plurality of masked group game components 304*a*, 304*b*, 304*c*, 304*d* and 304*e*. In this example, the gaming system enables player S to selectively apply the provided 2× modifier to any one of the displayed masked group components regardless of whether any modifiers were previously applied to any of the masked group game components by any of the players. Moreover, the gaming system enables player S to apply the provided 2× modifier to the A masked game component 304*a* regardless of the A masked group game component already assigned with a modifier previously applied by player R. An appropriate message such as "CONGRATULATIONS! YOU HAVE EARNED ONE 2× MODIFIER. PLEASE APPLY YOUR 2× MODIFIER TO ONE OF THE GROUP GAME COMPONENTS" is provided to player S visually, such as in the message display 306*b*, or through suitable audio or audiovisual displays.

As illustrated in FIG. 9A, player R applies the modifier to the A masked group game component 304*a*. In this example embodiment, the gaming system displays an indication (i.e., the highlighted border) to player R which indicates that player R has assigned the modifier to the A masked group game component. An appropriate message such as "YOU APPLIED YOUR 2× MODIFIER TO THE A GROUP GAME COMPONENT" is provided to player R visually, such as in the message display 306*a*, or through suitable audio or audiovisual displays.

In this example embodiment, for each masked group game component, the group display device 302 displays a message which indicates which player has assigned a modifier to that masked group game component. As illustrated in FIG. 9A, the group display device 302 displays an message which indicates that player R has assigned a modifier to the A masked group game component 304*a*. For the A masked group game component, the group display device 302 displays an appropriate message such as "ONE MODIFIER FOR PLAYER R APPLIED."

In this example embodiment, after a player applies each modifier provided in response to an occurrence of the modifier accumulation event, the display device of that player's gaming device returns to the normal game until the occurrence of a modifier accumulation event for that gaming device or a bonus triggering event for any of the gaming devices. That is, the player is enabled to place a wager to continuing playing the game.

Figure 9B:
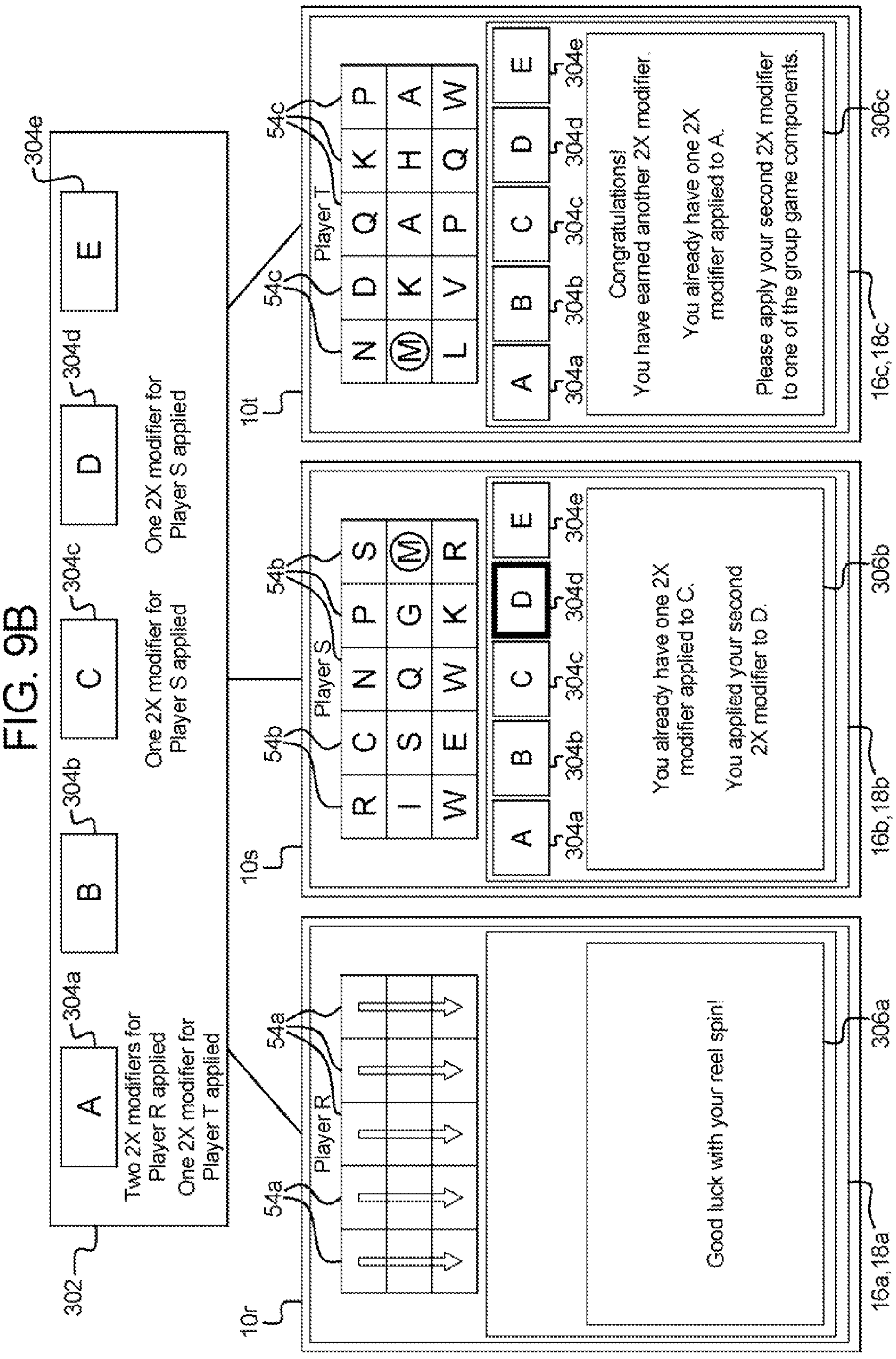

FIG. 9B illustrates a diagrammatic front view of this example embodiment in which the gaming system previously provided: (i) a second modifier to player R which was previously applied to the A masked group game component 304*a* (as indicated by the group display device 302); (ii) one modifier to player S which was previously applied to the C masked group game component 304*c* (as indicated by the group display device 302); and (iii) one modifier to player T which was previously applied to the A masked group game component 304*a* (as indicated by the group display device 302).

In FIG. 9B, the group display device 302 displays a message which indicates that player R applied a second 2× modifier to the A masked group game component. Moreover, the group display device 302 displays a message which indicates that player T applied a 2× modifier to the A masked group game component 304*a*.

As illustrated in FIG. 9B, upon receiving the wager for player R (not shown), the gaming device 10*r* causes the plurality of reels 54*a* to spin. An appropriate message such as "GOOD LUCK WITH YOUR REEL SPIN!" is provided to player R visually, such as in the message display 306*a*, or through suitable audio or audiovisual displays.

As illustrated in FIG. 9B, the gaming device 10*t* provides one 2× modifier to Player T for the one "M" symbol generated on the plurality of reels 54*c*. Display device 16*c*, 18*c* displays the plurality of different masked group game components 304*a*, 304*b*, 304*c*, 304*d* and 304*e* because the gaming device 10*t* provided player T with a modifier. The gaming system enables player T to apply the provided modifier to any of the plurality of masked group game components 304*a*, 304*b*, 304*c*, 304*d* and 304*e*. An appropriate message such as "CONGRATULATIONS! YOU HAVE EARNED ANOTHER MODIFIER. YOU ALREADY HAVE ONE MODIFIER APPLIED TO A. Please Apply Your Second Modifier to One of the Group GAME COMPONENTS" is provided to player T visually, such as in the message display 306*c*, or through suitable audio or audiovisual displays.

As illustrated in FIG. 9B, the gaming device 10*s* provided one 2× modifier to player S for the one "M" symbol generated on the plurality of reels 54*b*. Display device 16*b*, 18*b* displays the plurality of different masked group game components 304*a*, 304*b*, 304*c*, 304*d* and 304*e* because the gaming device 10*s* provided player S with a modifier. As illustrated in FIG. 9B, player S applies the modifier to the D masked group game component 304*d*. In this example embodiment, the gaming system displays an indication (i.e., the highlighted border) to player S which indicates that player S has assigned the modifier to the D masked group game component 304*d*. An appropriate message such as "YOU ALREADY HAVE ONE MODIFIER APPLIED TO C. YOU APPLIED YOUR SECOND MODIFIER TO D" is provided to player S visually, such as in the message display 306*b*, or through suitable audio or audiovisual displays.

In FIG. 9B, for the A masked group game component 304*a*, the group display device 302 displays an appropriate message such as "TWO MODIFIERS FOR PLAYER R APPLIED. ONE MODIFIER FOR PLAYER T APPLIED." For the B masked group game component 304*b*, the group display device 302 displays an appropriate message such as "ONE MODIFIER FOR PLAYER S APPLIED." For the D masked group game component 304*d*, the group display device 302 displays an appropriate message such as "ONE MODIFIER FOR PLAYER S APPLIED."

Figure 9C:
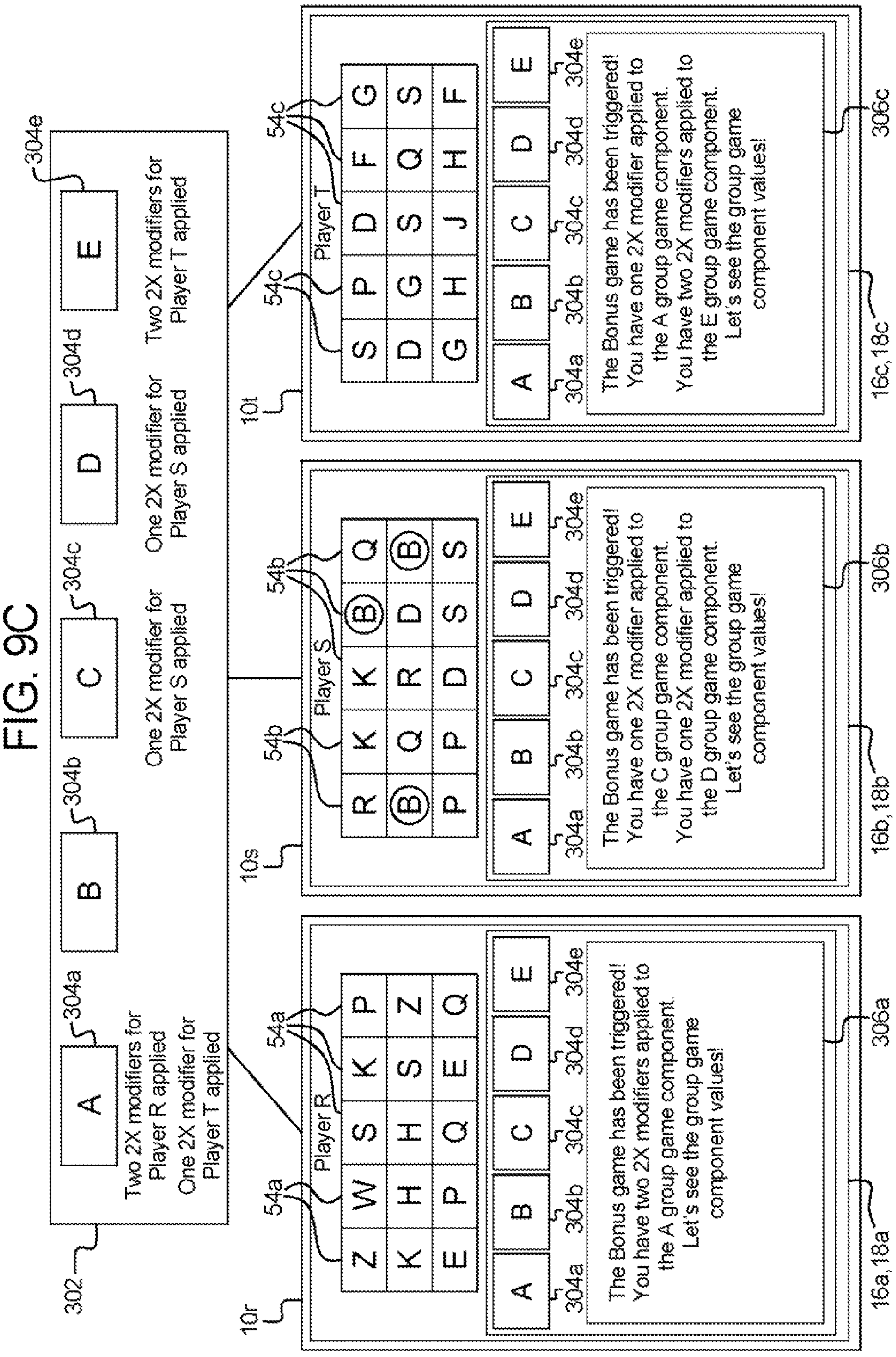

In this example embodiment, the gaming system determines a group game component award for each of the masked group game components upon a group bonus triggering event. The group bonus triggering event is based on a number of designated symbols generated in the play of a game. The gaming system monitors each of the gaming devices to determine whether any of the gaming devices generates the number of designated symbols for a play of a game. In this example embodiment, the gaming system determines a group game component award for each of the masked group game components if one of the gaming devices generates at least three "B" symbols on the plurality of reels for a play of a game. As illustrated in FIG. 9C, the group bonus triggering event occurs because the gaming device 10*s* generated the three "B" symbols on the plurality of reels 54*b*.

In this example embodiment, upon the occurrence of the bonus trigger event, each of the displays devices of each of the gaming devices 10*r*, 10*s*, and 10*t* displays each of the plurality of masked group game components. In FIG. 9C, each display device 16*a*, 18*a*, 16*b*, 18*b*, and 16*c*, 18*c* displays the plurality of different masked group components 304*a*, 304*b*, 304*c*, 304*d* and 304*e* in response to the occurrence of the bonus trigger event.

For the gaming device 10*r*, an appropriate message such as "THE BONUS GAME HAS BEEN TRIGGERED! YOU HAVE TWO MODIFIERS APPLIED TO A. LET'S SEE THE GROUP GAME COMPONENT VALUES!" is provided to player R visually, such as in the message display 306*a*, or through suitable audio or audiovisual displays. For the gaming device 10*s*, an appropriate message such as "THE BONUS GAME HAS BEEN TRIGGERED! YOU HAVE ONE MODIFIER APPLIED TO C. YOU HAVE ONE MODIFIER APPLIED TO D. LET'S SEE THE GROUP GAME COMPONENT VALUES!" is provided to player B visually, such as in the message display 306*b*, or through suitable audio or audiovisual displays. For the gaming device 10*t*, an appropriate message such as "THE BONUS GAME HAS BEEN TRIGGERED! YOU HAVE ONE MODIFIER APPLIED TO A. YOU HAVE ONE MODIFIER APPLIED TO E. LET'S SEE THE GROUP GAME COMPONENT VALUES!" is provided to player T visually, such as in the message display 306*c*, or through suitable audio or audiovisual displays.

In this example embodiment, if the bonus triggering event occurs after a player is provided a modifier and before that player applies that modifier, the gaming system enables that player to apply that modifier to the next available plurality of masked group game components.

Figure 9D:
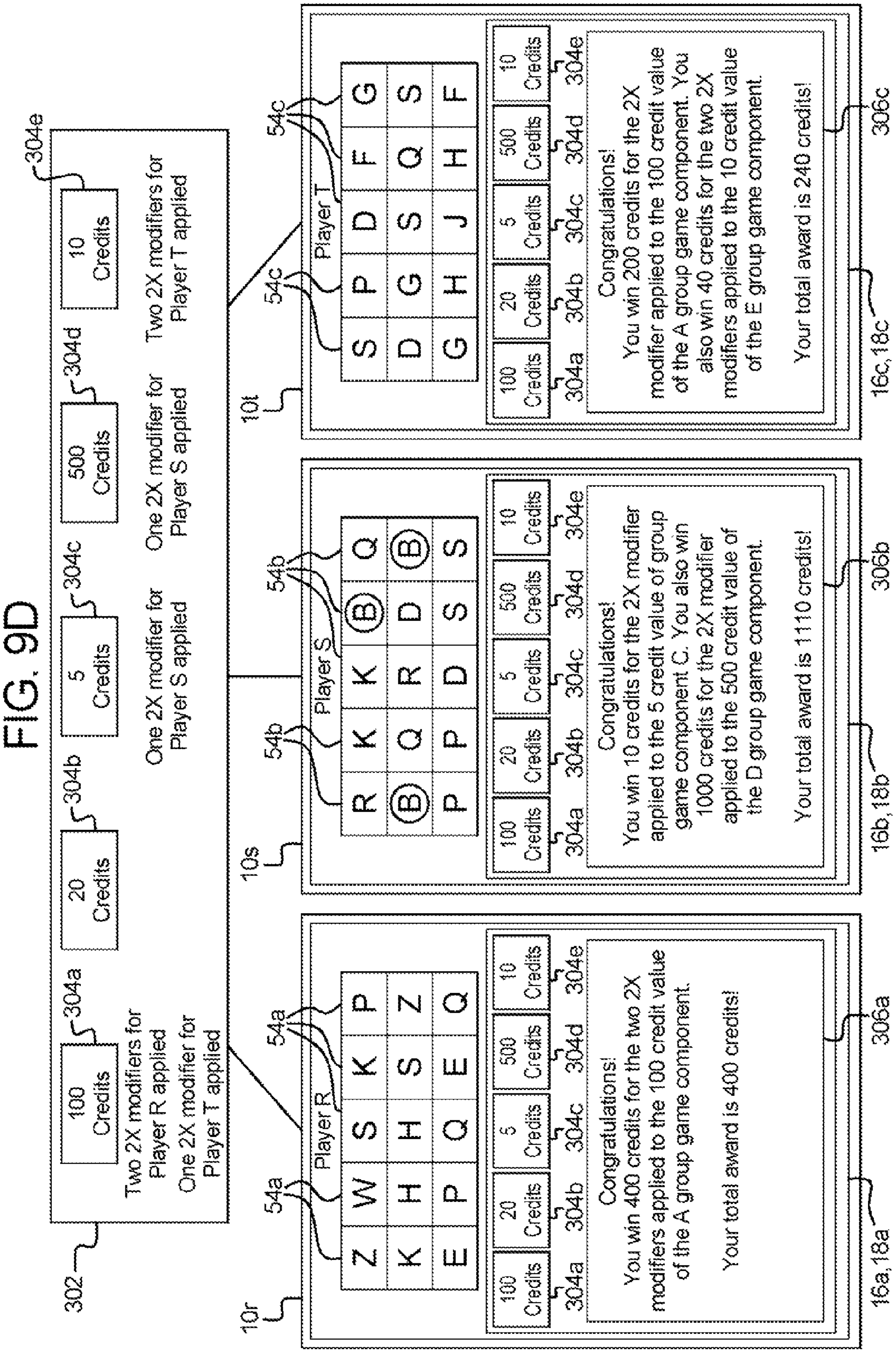

In this example embodiment, the gaming system determines and displays a group game component award for each of the masked group game components in response to the occurrence of the bonus trigger event. As illustrated in FIG. 9D, the gaming system determines and displays a group game component award of: (i) 100 credits for the A group game component 304*a*; (ii) 20 credits for the B group game component 304*b*; (iii) 5 credits for the C group game component 304*c*; (iv) 500 credits for the D group game component 304*d*; and (v) 10 credits for the E group game component 304*e*.

In this example embodiment, after the determination of the group game component award for each of the group game components, for each gaming device, the gaming system determines an award to provide to the player of that gaming device based on: (i) the determined group game component award for each of the group game components having a modifier applied to that group game component by the player of that gaming device; and (ii) the modifiers applied by the player of that gaming device to the group game components.

In FIG. 9D, the gaming system determines, for the gaming device 10*r*, an award to provide to player R based on the determined group game component award for the group game component 304*a* (i.e., the 100 credits for the group game component 304*a*) and the modifiers applied by player R to the group game component 304*a* (i.e., the two 2× modifiers applied to the group game component 304*a*). Accordingly, for the gaming device 10*r*, the gaming system determines an award of 400 credits to provide to player R (i.e. the two 2× multipliers applied to the group game component 304*a* times 100 credits for the group game component 304*a*).

In this example embodiment, for each group game component having a plurality of modifiers applied by the same player, the gaming system adds each modifier applied to that group game component. That is, when the gaming system determines the award for the group game component 304*a* for player R, the two multipliers are added together to result in a total multiplier of 4× applied to the group game component 304*a* (i.e., the first 2× multiplier plus the second 2× multiplier). It should be appreciated that, similar to the modifiers described above, any applied modifier is configured to perform any suitable mathematical function on any determined group game component award. For example, in one alternative embodiment, three separate 2× modifiers applied individually to a masked group game component may result in a total modifier of 8× applied to the group game component award for that masked group game component (i.e., 2× times 2× times 2×).

In FIG. 9D, for the gaming device 10*s*, the gaming system determines an award to provide to player S based on the determined group game component awards for the group game components 304*c* and 304*d* (i.e., the 5 credits for the group game component 304*c* and the 500 credits for the group game component 304*d*) and the modifiers applied by player S to those group game components (i.e., the 2× modifier applied to the group game component 304*c* and the 2× modifier applied to the group game component 304*d*). Accordingly, for the gaming device 10*s*, the gaming system determines an award of 1110 credits (i.e., the 5 credits for the group game component 304*c* times the 2× multiplier plus the 500 credits for the group game components 304*d* times the 2× multiplier). For the gaming device 10*t*, the gaming system determines an award to provide to player T based on the determined group game component awards for the group game components group game components 304*a* and 304*e* (i.e., the 100 credits for the group game component 304*a* and the 10 credits for the group game component 304*e*) and the modifiers applied by player T to the group game components 304*a* and 304*e* (i.e., the 2× modifier applied to the group game component 304*a* and the two 2× modifiers applied to the group game component 304*e*). Accordingly, for the gaming device 10*t*, the gaming system determines an award of 240 credits (i.e., the 2× multiplier applied to the group game component 304*a* times the 100 credits for the group game component 304*a* plus the two 2× multipliers applied to the group game component 304*e* times the 10 credits for the group game component 304*e*).

In this example embodiment, for each gaming device, the gaming system displays and provides the determined award to the player. For the gaming device 10*r*, an appropriate message such as "CONGRATULATIONS! YOU WIN 400 CREDITS FOR THE TWO 2× MODIFIERS APPLIED TO THE 100 CREDIT VALUE OF THE A GROUP GAME COMPONENT. YOUR TOTAL AWARD IS 400 CREDITS!" is provided to player R visually, such as in the message display 306*a*, or through suitable audio or audiovisual displays. For the gaming device 10*s*, an appropriate message such as "CONGRATULATIONS! YOU WIN 10 CREDITS FOR THE 2× MODIFIER APPLIED TO THE 5 CREDIT VALUE OF THE C GROUP GAME COMPONENT. YOU ALSO WIN 1000 CREDITS FOR THE 2× MODIFIER APPLIED TO THE 500 CREDIT VALUE OF THE D GROUP GAME COMPONENT. YOUR TOTAL AWARD IS 1110 CREDITS!" is provided to player S visually, such as in the message display 306*b*, or through suitable audio or audiovisual displays. For the gaming device 10*t*, an appropriate message such as "CONGRATULATIONS! YOU WIN 200 CREDITS FOR THE 2× MODIFIER APPLIED TO THE 100 CREDIT VALUE OF THE A GROUP GAME COMPONENT. YOU ALSO WIN 40 CREDITS FOR THE TWO 2× MODIFIERS APPLIED TO THE 10 CREDIT VALUE OF THE E GROUP GAME COMPONENT. YOUR TOTAL AWARD IS 240 CREDITS!" is provided to player T visually, such as in the message display 306*c*, or through suitable audio or audiovisual displays.

Figure 10A:
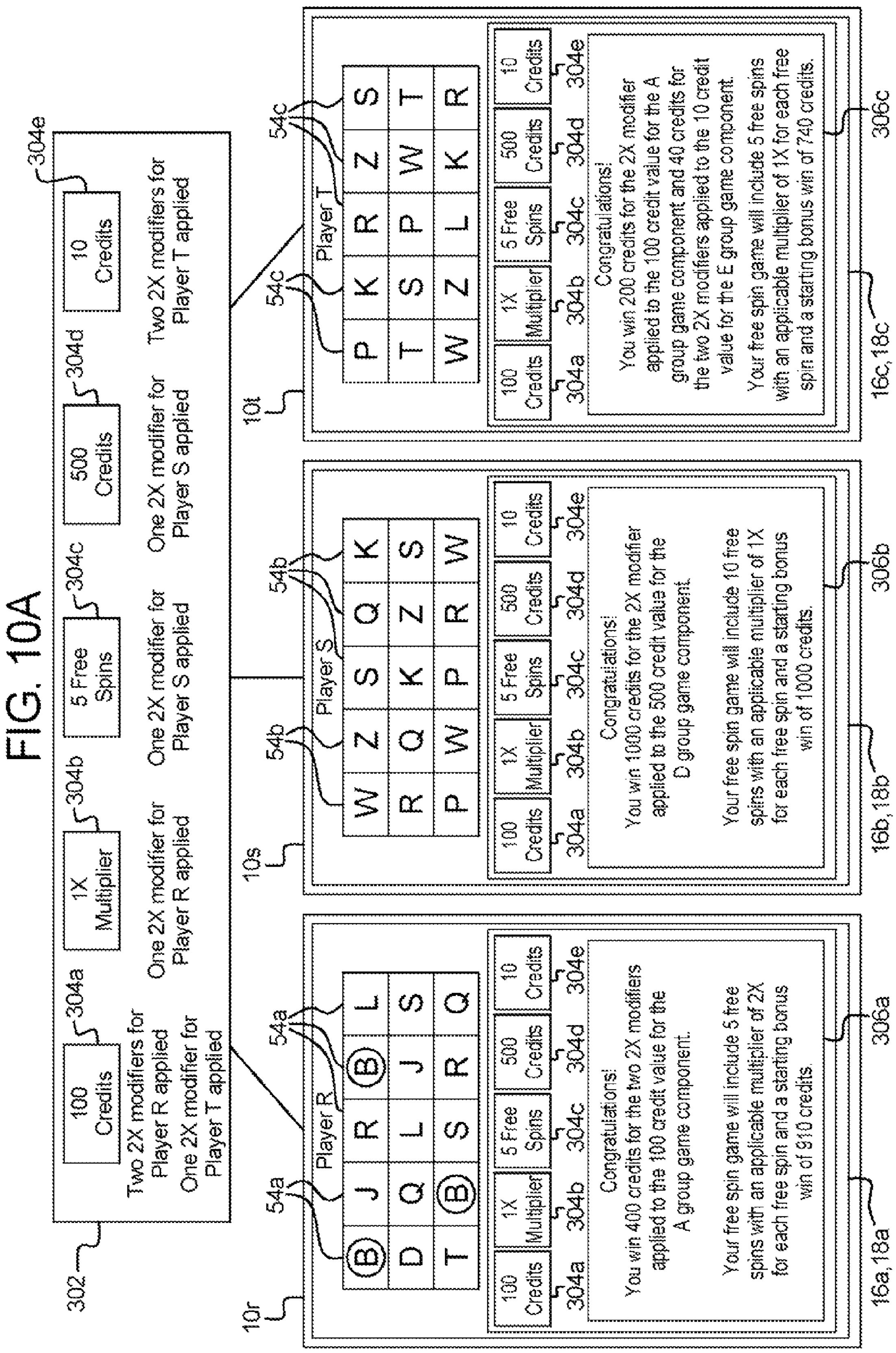
FIG. 10A is diagrammatic front view of one embodiment of the gaming system disclosed herein illustrating different determined group game component awards for each of the masked group game components, wherein the different determined group game components awards are used by the players during a free spin game.

Referring now to FIGS. 10A and 10B, this second example embodiment generally shows an example illustrating the gaming system providing a different quantity of frees spin games for each player with certain applicable multipliers based on the amount of modifiers previously applied to the masked group game components. In this example embodiment, each of the masked group game components is associated with a default applied modifier of 1×. The gaming system provides a separate award to each of the players of the gaming devices, wherein each separate award is based on the determined award for each group game component and the respective modifiers applied to each of the group gaming components by that player. That is, in this example embodiment, for each player, the gaming system provides an award based on all of the determined group game component awards and the modifiers applied to any of the group game components.

The example embodiment illustrated in FIG. 10A picks up at a point in time where the gaming system determines, for each gaming device, an award to provide to the player of that gaming device based on: (i) the determined group game component award for each of the group game components; and (ii) the modifiers applied by the player of that gaming device to the group game components. In FIG. 10A, the gaming system determined and displayed a group game component award of: (i) 100 credits for the A group game component 304*a*; (ii) a 1× multiplier for the B group game component 304*b*; (iii) 5 free spins for the C group game component 304*c*; (iv) 500 credits for the D group game component 304*d*; and (v) 10 credits for the E group game component 304*e*.

Accordingly, the gaming system in FIG. 10A determines that for gaming device 10*r*, when accounting for modifiers applied by player R to the group game components 304*a* and 304*b* (i.e., the two 2× modifiers applied to the group game component 304*a* and the 2× modifier applied to the group game component 304*b*) and each of the determined group game component awards for the group game components 304*a*, 304*b*, 304*c*, 304*d*, and 304*e* (i.e., the 100 credits for the group game component 304*a*, the 1× multiplier for the group game component 304*b*, the 5 free spins for the group game component 304*c*, the 500 credits for the group game component 304*d*, and the credits for the group game component 304*e*), the free spin game will include a total of five free spins with an applicable multiplier of 2× for each free spin and a starting bonus of 910 credits. It should be appreciated that the gaming system determined the starting bonus of 910 credits based the each of the determined credit awards for the group game components and any modifiers applied by player R to the determined credit awards. (i.e., the two 2× modifiers times the 100 credits for the group game component 304*a* plus the 500 credits for the group game component 304*d* plus the 10 credits for the group game component 304*e*). For the gaming device 10*r*, an appropriate message such as "CONGRATULATIONS! YOU WIN 400 CREDITS FOR THE TWO 2× MODIFIERS APPLIED TO THE 100 CREDIT VALUE FOR THE A GROUP GAME COMPONENT. YOUR FREE SPIN GAME WILL INCLUDE 5 FREE SPINS WITH AN APPLICABLE MULTIPLIER OF 2× FOR EACH FREE SPIN AND A STARTING BONUS WIN OF 910 CREDITS" is provided to player R visually, such as in the message display 306*a*, or through suitable audio or audiovisual displays.

In FIG. 10A, the gaming system determines that for gaming device 10*s*, when accounting for modifiers applied by player S to the group game components 304*c* and 304*d* (i.e., the 2× modifier applied to the group game component 304*c* and the 2× modifier applied to the group game component 304*d*) and the determined group game component awards for each of the group game components 304*a*, 304*b*, 304*c*, 304*d*, and 304*e*, (i.e., the 100 credits for the group game component 304*a*, the 1× multiplier for the group game component 304*b*, the 5 free spins for the group game component 304*c*, the 500 credits for the group game component 304*d*, and the 10 credits for the group game component 304*e*), the free spin game will include a total of ten free spins with an applicable multiplier of 1× for each free spin and a starting bonus of 1110 credits. It should be appreciated that the gaming system determined the starting bonus of 1110 credits based the each of the determined credit awards for the group game components and any modifiers applied by player S to the determined credit awards. (i.e., the 100 credits for the group game component 304*a* plus the 2× multiplier times 500 credits for the group game component 304*d* plus the 10 credits for the group game component 304*e*). It should also be appreciated that the gaming system provided player S with twice as many free spin games than player R and player T because player S applied a 2× multiplier to masked group game component 304*c*. For the gaming device 10*s*, an appropriate message such as "CONGRATULATIONS! YOU WIN 1000 CREDITS FOR THE 2× MODIFIER APPLIED TO THE 500 CREDIT VALUE FOR THE C GROUP GAME COMPONENT. YOUR FREE SPIN GAME WILL INCLUDE 10 FREE SPINS WITH AN APPLICABLE MULTIPLIER OF 1× FOR EACH FREE SPIN AND A STARTING BONUS WIN OF 1000 CREDITS" is provided to player S visually, such as in the message display 306*b*, or through suitable audio or audiovisual displays.

In FIG. 10A, the gaming system determines that for gaming device 10*t*, when accounting for modifiers applied by player T to the group game components 304*a* and 304*e* (i.e., the 2× modifier applied to the group game component 304*a* and the two 2× modifiers applied to the group game component 304*e*) and each of the determined group game component awards for the group game components (i.e., the 100 credits for the group game component 304*a*, the 1× multiplier for the group game component 304*b*, the 5 free spins for the group game component 304*c*, the 500 credits for the group game component 304*d*, and the 10 credits for the group game component 304*e*), the free spin game will include a total of five free spins with an applicable multiplier of 1× for each free spin and a starting bonus of 740 credits. It should be appreciated that the gaming system determined the starting bonus of 740 credits based the each of the determined credit awards for the group game components 304*a*, 304*d*, and 304*e* and the modifiers applied by player R to the determined credit awards for the group game components 304*a*, 304*d*, and 304*e* (i.e., the 2× modifier times the 100 credits for the group game component 304*a* plus the 500 credits for the group game component 304*d* plus the two 2× multipliers times the 10 credits for the group game component 340*e*). For the gaming device 10*t*, an appropriate message such as "CONGRATULATIONS! YOU WIN 200 CREDITS FOR THE 2× MODIFIER APPLIED TO THE 100 CREDIT VALUE FOR THE A GROUP GAME COMPONENT AND 40 CREDITS FOR THE TWO 2× MODIFIERS APPLIED TO THE 10 CREDIT VALUE FOR THE E GROUP GAME COMPONENT. YOUR FREE SPIN GAME WILL INCLUDE 5 FREE SPINS WITH AN APPLICABLE MULTIPLIER OF 1× FOR EACH FREE SPIN AND A STARTING BONUS WIN OF 740 CREDITS" is provided to player T visually, such as in the message display 306*c*, or through suitable audio or audiovisual displays.

As illustrated in FIG. 10B, the gaming system provides player R each of the five free spins in the free spin game. It should be appreciated that as seen in FIG. 10B, for each free spin, the gaming system modified the determined award for that free spin by the applicable multiplier of 2× such that the total number of free spins for player R resulted in an award of 12 credits or $12.00 provided to player R. After providing player R five free spins of the free spin game and each determined award for the five free spins, the gaming device 10*r* returns to a normal game play mode.

As illustrated in FIG. 10B, the gaming system provides player S each of the ten free spins in the free spin game. It should be appreciated that as seen in FIG. 10B, for each free spin, the gaming system modified the determined award for that free spin by the applicable multiplier of 1× such that the total number of free spins for player S resulted in an award of 18 credits or $18.00 provided to player S. After providing player S ten free spins of the free spin game and the determined award for the ten free spins, the gaming device 10*s* returns to a normal game play mode.

As illustrated in FIG. 10B, the gaming system provides player T each of the five free spins in the free spin game. It should be appreciated that as seen in FIG. 10B, for each free spin, the gaming system modified the determined award for that free spin by the applicable multiplier of 1× such that the total number of free spins for player T resulted in an award of 6 credits or $6.00 provided to player T. After providing player T five free spins of the free spin game and the determined award for the five free spins, the gaming device 10*t* returns to a normal game play mode.

In various alternative embodiments, the modifier accumulation event may be based on, but not limited to, one or more of: (i) an amount of time played on the gaming system; (ii) a random time of the day; (iii) an amount of money wagered on the gaming system; (iv) an amount of money lost at the gaming system; (v) an amount of money won at the gaming system; (vi) an amount of money wagered at games in a gaming system; (vii) an amount of money lost at the gaming systems in a gaming system; (viii) an amount of money won at the gaming systems in a gaming system; (ix) an event or outcome occurring in the primary game of one of the gaming systems; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; and (xv) any combination of these.

In one embodiment, where the gaming device for a plurality of the gaming devices each provide to the player of that gaming device one or more modifiers upon a modifier accumulation event, different players are provided with different quantities of modifiers. In another embodiment, where the gaming device for a plurality of the gaming devices each provide to the player of that gaming device one or more modifiers upon a modifier accumulation event upon a modifier accumulation event, each of the players are provided with the same quantity of modifiers.

Similar to the displayed game components described above, the different displayed group game components can include, but are not limited to:

1. a quantity of free spins;
2. a quantity of free activations of one or more games;
3. an applicable multiplier for at least one, a plurality or each of the free spins;
4. a starting credit amount (based on a triggering event and/or a wager placed);
5. a quantity of picks in the game;
6. a quantity of selections in the game;
7. a quantity of wild symbols in the game;
8. a quantity of retrigger symbols in the game;
9. a quantity of terminators or termination symbols in the game;
10. a quantity of anti-terminators in the game;
11. a quantity of locking reels in the game;
12. a quantity of locking symbol positions in the game;
13. a quantity of expanding symbols in the game;
14. a quantity of rounds or levels in the game;
15. a quantity of award opportunities in the game;
16. a quantity of progressive awards in the game;
17. a range of available awards in the game;
18. a maximum award in the game;
19. a minimum award in the game;
20. an average expected award in the game;
21. a quantity of active reels in the game;
22. a quantity of active paylines in the game;
23. a quantity of offers in the game;
24. a paytable will be utilized in the game;
25. a quantity of hands of playing cards in the game;
26. any game component disclosed herein; and
27. any other suitable game component.

In one embodiment, for each gaming device, the gaming system causes each that gaming device to display the masked group game components during each play of the game. That is, in this example, the masked group game components are displayed during normal game play mode for each of the gaming devices.

In one embodiment, the gaming system does not enable each player to independently apply any provided modifiers to any one of the displayed masked group game components regardless of whether any modifiers were previously applied to any of the masked group game components by that player or by another player at another gaming device. That is, in this embodiment, for each player, if another player or that player previously applied a modifier to one of the masked group game components, that player cannot apply a second modifier to that masked group game component.

In one embodiment, the group bonus triggering event occurs based on an elapsed period of time, such as ten minutes since the last occurrence of a group bonus triggering event. In various alternative embodiments, the group bonus triggering event may be based on, but not limited to, one or more of: (i) a random time of the day; (ii) an amount of money wagered on the gaming system; (iii) an amount of money lost at the gaming system; (iv) an amount of money won at the gaming system; (v) an amount of money wagered at games in a gaming system; (vi) an amount of money lost at the gaming systems in a gaming system; (vii) an amount of money won at the gaming systems in a gaming system; (viii) an event or outcome occurring in the primary game of one of the gaming systems; (ix) an event occurring due to a shared random outcome generation; (x) meeting one or more thresholds, such as a number of plays or a wager pool exceeding a designated amount; (xi) a random determination based on an amount wagered; (xii) an occurrence of a predetermined event; (xiii) one or more side wagers placed; and (xiv) any combination of these.

In one embodiment, the gaming system provides an additional award to the player of the gaming device that triggered the group bonus triggering event. In one such embodiment, for a gaming device that triggers the bonus trigger event, the gaming system provides the player of that gaming device an additional multiplier which can be applied to any of the masked group game components. In one embodiment, one of the gaming devices provides an additional award to the player of that gaming device if that player applied each provided modifier to one of the group game components. In one embodiment, the gaming device provides an additional award to the player of that gaming device if that player applied at least one modifier to each of the group game components. In one embodiment, for the first player to apply at least one modifier to each of the group game components, the gaming device provides an additional award to that player. It should be appreciated that the additional award can be any suitable award.

In one embodiment, the gaming system associates the plurality of different masked group game components with a plurality of different paytables. In this embodiment, the plurality of different paytables are associated with a plurality of different average expected payback percentages. In one embodiment, the award provided to the players is based on the paytables associated with the average expected payback percentages. In one embodiment, the gaming system changes an average expected payback percentage for a masked group game component as a player progresses though a plurality of games. That is, the total average expected payback percentage increases as the player plays more games.

In one embodiment, the gaming system provides an additional award based on the application of a modifier to a masked group game component associated with group game component award of the highest value. In one example embodiment, a first player applies a first modifier to a first masked group game component and a second player applies a second modifier to a second masked group game component. In this example, the gaming system then determines an award of 100 credits for the first masked group game component and an award of 50 credits for the second masked group game component. In this example embodiment, the gaming system provides an additional award to the first player because the first player applied a modifier to the first group game component associated with the highest value (i.e., the 100 credits). It should be appreciate that in this example the second player does not receive the additional award because the second player did not apply the any modifiers to the first masked group game component associated with the highest value (i.e., the first group game component).

In one embodiment, each accumulated modifier is associated with a value. In one such embodiment, if a player forfeits an accumulated modifier (for example, due to player inactivity or the player cashing out before the bonus trigger event), the gaming system contributes at least part of the value of such forfeited accumulated modifier to increase one or more group game component awards for one or more group game components. In another such embodiment, the gaming system provides the forfeited values of any provided modifiers to any players that applied modifiers to the masked group game component associated with the determined group game component award of the highest value. Accordingly, in this embodiment, at least part of the value of one or more accumulated modifiers is redistributed from the player that accumulated such accumulated modifier to one or more other players that are provided the value of such accumulated modifier as part of an award.

In one embodiment, for each of any players that forfeited an accumulated modifier, the gaming system provides such players a consolation award. In one embodiment, the consolation award provided to each player is based on a portion of the value of that player's accumulated modifier. In this embodiment, the remaining portion of the value of that player's modifier is contributed to the group game component award as described above.

In one embodiment, for each player, the application of a first modifier qualifies that player to receive awards based on determined group game component awards for one or more of the group game components. That is, if a player has not applied any modifiers to any game components, that player does not receive any awards based on any game component awards determined for each of the masked group game components upon the bonus triggering event. In this example, if a player applies at least one modifier, the gaming system will provide that player an award (upon the bonus triggering event) based on, at least in part, each of the group game component awards determined for each of the group game components.

In one embodiment, the award provided to the player is based on the player's wager. In one such embodiment, the number of modifiers to provide to the player is based on the player's wager. In another such embodiment, the value of a modifier to provide to the player is based on the player's wager. In another such embodiment, the value of the group game component award for each of the masked group game components is based on the player's wager.

In various alternative embodiments, the award provided to the player may be based on but not limited to at least one of: (i) an amount of time played on the gaming system; (ii) a random time of the day; (iii) an amount of money wagered on the gaming system; (iv) an amount of money lost at the gaming system; (v) an amount of money won at the gaming system; (vi) an amount of money wagered at games in a gaming system; (vii) an amount of money lost at the gaming systems in a gaming system; (viii) an amount of money won at the gaming systems in a gaming system; (ix) an event or outcome occurring in the primary game of one of the gaming systems; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; and (xv) any combination of these.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming devices, each of said gaming devices including:

at least one processor, at least one input device, at least one display device, and at least one memory device which stores a plurality of instructions, which when executed by the at least one processor, cause the at least one processor to operate with the at least one display device and the at least one input device; and a controller configured to communicate with each of said gaming devices, said controller and said plurality of gaming devices configured to operate to:

(a) display a plurality of masked group game components;

(b) for each of said gaming devices:

(i) enable a player of said gaming device to place at least one wager to play at least one play of a game;

(ii) upon a modifier accumulation event, display and provide a quantity of at least one modifier;

(iii) for each provided modifier, enable the player of that gaming device to apply said modifier to one of said displayed plurality of masked group game components regardless of whether another player applied any modifiers to said masked group game components; and (c) upon a group bonus triggering event:

(i) determine a group game component award for each of a plurality of the masked group game components;

(ii) for each gaming device, determine an award for the player of that gaming device based on:

(A) the determined group game component award for each of the group game components having at least one modifier applied by the player of that gaming device; and (B) the modifiers applied by the player of that gaming device to said group game components;

(iii) display and provide said determined award.

2. The gaming system of claim 1, wherein a plurality of said modifiers are different.

3. The gaming system of claim 1, wherein said modifier accumulation event is based on a designated symbol combination.

4. The gaming system of claim 1, wherein when executed by the at least one processor, said plurality of instructions cause the at least one processor to, for each gaming device and for each provided modifier, enable the player of that gaming device to apply a plurality of modifiers to the same one of the plurality of masked group game components.

5. The gaming system of claim 1, wherein when executed by the at least one processor, said plurality of instructions cause the at least one processor to, for each gaming device and for each provided modifier, enable the player of that gaming device to apply a plurality, but not all, of the modifiers to the same one of the plurality of masked group game components.

6. The gaming system of claim 1, wherein said group bonus triggering event is based on an elapsed period of time.

7. The gaming system of claim 1, wherein when executed by the at least one processor, said plurality of instructions cause the at least one processor to, upon the group bonus triggering event, determine a group game component for each of the masked group game components.

8. The gaming system of claim 1, wherein when executed by the at least one processor, said plurality of instructions cause the at least one processor to, for each gaming device, determine the award for the player of that gaming device based on the determined group game component award for each of the group game components.

9. The gaming system of claim 1, wherein the group game component awards for each of the masked group game components and the determined awards for one or more of the players are selected from the group consisting of: a quantity of free spins, an multiplier for at least one free spin, a starting credit amount, a quantity of picks, a quantity of selections, a quantity of wild symbols, a quantity of retrigger symbols, a quantity of termination symbols, a quantity of anti-terminators, a quantity of locking reels, a quantity of locking symbol positions, a quantity of expanding symbols, a quantity of rounds, a quantity of award opportunities, a quantity of progressive awards, a range of awards, a maximum award, a minimum award, an average expected award, a quantity of active reels, a quantity of active paylines, a quantity of offers, a paytable, and a quantity of hands of playing cards.

10. A gaming system comprising:

at least one processor;

at least one input device;

at least one display device; and at least one memory device which stores a plurality of instructions, which when executed by the at least one processor, cause the at least one processor to operate with the at least one display device and the at least one input device to:

(a) enable a player to place at least one wager to play at least one play of a game;

(b) upon a modifier accumulation event, display and provide a quantity of at least one modifier;

(c) for each provided modifier, enable the player to apply said modifier to one of a plurality of displayed masked group game components regardless of whether another player applied any modifiers to said masked group game components; and (d) upon a group bonus triggering event:

(i) determine a group game component award for each of a plurality of the masked group game components having at least one modifier applied by the player;

(ii) determine an award based on the determined group game component award for each of the group game components and the modifiers applied to said group game components; and (iii) display and provide said determined award to the player.

11. The gaming system of claim 10, wherein a plurality of said modifiers are different.

12. The gaming system of claim 10, wherein said modifier accumulation event is based on a designated symbol combination.

13. The gaming system of claim 10, wherein when executed by the at least one processor, said plurality of instructions cause the at least one processor to, for each provided modifier, enable the player of that gaming device to apply a plurality of modifiers to the same one of the plurality of masked group game components.

14. The gaming system of claim 10, wherein when executed by the at least one processor, said plurality of instructions cause the at least one processor to, for each provided modifier, enable the player of that gaming device to apply a plurality, but not all, of the modifiers to the same one of the plurality of masked group game components.

15. The gaming system of claim 10, wherein said group bonus triggering event is based on an elapsed period of time.

16. The gaming system of claim 10, wherein when executed by the at least one processor, said plurality of instructions cause the at least one processor to, upon the group bonus triggering event, determine a group game component for each of the masked group game components having at least one modifier applied by the player.

17. The gaming system of claim 10, wherein when executed by the at least one processor, said plurality of instructions cause the at least one processor to determine the award for the player of that gaming device based on the determined group game component award for each of the group game components.

18. The gaming system of claim 10, wherein the group game component awards for each of the masked group game components and the displayed and provided awards to the player are selected from the group consisting of: a quantity of free spins, an multiplier for at least one free spin, a starting credit amount, a quantity of picks, a quantity of selections, a quantity of wild symbols, a quantity of retrigger symbols, a quantity of termination symbols, a quantity of anti-terminators, a quantity of locking reels, a quantity of locking symbol positions, a quantity of expanding symbols, a quantity of rounds, a quantity of award opportunities, a quantity of progressive awards, a range of awards, a maximum award, a minimum award, an average expected award, a quantity of active reels, a quantity of active paylines, a quantity of offers, a paytable, and a quantity of hands of playing cards.

19. A gaming system comprising:
- a plurality of gaming devices, each of said gaming devices including:
  - at least one processor,
  - at least one input device,
  - at least one display device, and
  - at least one memory device which stores a plurality of instructions, which when executed by the at least one processor, cause the at least one processor to operate with the at least one display device and the at least one input device; and
- a controller configured to communicate with each of said gaming devices, said controller and said plurality of gaming devices configured to operate to:
  - (a) for a first one of the gaming devices which has accumulated a first plurality of modifiers:
    - (i) enable a player of said gaming device to place at least one wager to play at least one play of a game,
    - (ii) enable the player of said gaming device to selectively apply each of said plurality of accumulated modifiers to any one of a plurality of group game components, wherein each modifier is selectively applied to any one of the plurality of group game components regardless of whether the player of said gaming device previously applied any modifiers to any one of the group game components,
    - (iii) determine a first award based on the group game components and said applied modifiers, and
    - (iv) display and provide the first award to the player of said gaming device; and
  - (b) for a second one of the gaming devices which has accumulated a second plurality of modifiers:
    - (i) enable a player of said gaming device to place at least one wager to play at least one play of the game,
    - (ii) enable the player of said gaming device to selectively apply each of said plurality of accumulated modifiers to any one of the plurality of group game components, wherein each modifier is selectively applied to any one of the plurality of group game components regardless of whether:
      - (A) the player of said gaming device previously applied any modifiers to any one of the group game components, and
      - (B) any other player previously applied any modifiers to any of the group game components,
    - (iii) determine a second award based on the group game components and said applied modifiers, and
    - (iv) display and provide the second award to the player of said gaming device.

20. The gaming system of claim 19, wherein a plurality of said modifiers are different.

21. The gaming system of claim 19, wherein when executed by the at least one processor, said plurality of instructions cause the at least one processor to determine the first award based on each of the group game components.

22. The gaming system of claim 19, wherein when executed by the at least one processor, said plurality of instructions cause the at least one processor to, for each gaming device, determine the award for the player of that gaming device based on a determined group game component award for each of said plurality of group game components.

23. The gaming system of claim 22, wherein the group game component awards for each of the masked group game components and the determined awards for each of said gaming devices are selected from the group consisting of: a quantity of free spins, an multiplier for at least one free spin, a starting credit amount, a quantity of picks, a quantity of selections, a quantity of wild symbols, a quantity of retrigger symbols, a quantity of termination symbols, a quantity of anti-terminators, a quantity of locking reels, a quantity of locking symbol positions, a quantity of expanding symbols, a quantity of rounds, a quantity of award opportunities, a quantity of progressive awards, a range of awards, a maximum award, a minimum award, an average expected award, a quantity of active reels, a quantity of active paylines, a quantity of offers, a paytable, and a quantity of hands of playing cards.

* * * * *

UNITED STATES PATENT AND TRADEMARK OFFICE

CERTIFICATE OF CORRECTION

PATENT NO. : 8,118,662 B2
APPLICATION NO. : 12/423596
DATED : February 21, 2012
INVENTOR(S) : Scott A. Caputo et al.

It is certified that error appears in the above-identified patent and that said Letters Patent is hereby corrected as shown below:

IN THE CLAIMS:

In Claim 1, Column 43, Line 15, after "modifier;" add --and--.

In Claim 1, Column 43, Line 33, after "components;" add --and--.

In Claim 4, Column 43, Lines 40 to 42, replace "when executed by the at least one processor, said plurality of instructions cause the at least one processor to" with --the controller and the plurality of gaming devices are configured to operate to--.

In Claim 4, Column 43, Line 44, replace the first instance of "the" with --a--.

In Claim 5, Column 43, Lines 46 to 48, replace "when executed by the at least one processor, said plurality of instructions cause the at least one processor to" with --the controller and the plurality of gaming devices are configured to operate to--.

In Claim 5, Column 43, Line 50, replace the second instance of "the" with --a--.

In Claim 7, Column 43, Lines 54 to 56, replace "when executed by the at least one processor, said plurality of instructions cause the at least one processor to" with --the controller and the plurality of gaming devices are configured to operate to--.

In Claim 7, Column 43, Line 57, between "component" and "for" insert --award--.

In Claim 8, Column 43, Lines 59 to 61, replace "when executed by the at least one processor, said plurality of instructions cause the at least one processor to" with --the controller and the plurality of gaming devices are configured to operate to--.

Signed and Sealed this
Fifth Day of June, 2012

David J. Kappos

David J. Kappos
*Director of the United States Patent and Trademark Office*

IN THE CLAIMS:

In Claim 13, Column 44, Line 51, delete “of that gaming device.”

In Claim 13, Column 44, Line 52, replace the first instance of “the” with --a--.

In Claim 14, Column 44, Line 57, delete “of that gaming device.”

In Claim 14, Column 44, Line 58, replace the second instance of “the” with --a--.

In Claim 17, Column 45, Line 4, delete “of that gaming device.”

In Claim 21, Column 46, Lines 25 to 27, replace “when executed by the at least one processor, said plurality of instructions cause the at least one processor to” with --the controller and the plurality of gaming devices are configured to operate to--.

In Claim 22, Column 46, Lines 29 to 31, replace “when executed by the at least one processor, said plurality of instructions cause the at least one processor to” with --the controller and the plurality of gaming devices are configured to operate to--.